(12) United States Patent
Bryant et al.

(10) Patent No.: US 8,898,633 B2
(45) Date of Patent: Nov. 25, 2014

(54) DEVICES, SYSTEMS, AND METHODS FOR CONFIGURING A PROGRAMMABLE LOGIC CONTROLLER

(75) Inventors: William K. Bryant, Johnson City, TN (US); Galen Freemon, Johnson City, TN (US); James W. Cornett, Bluff City, TN (US); Temple L. Fulton, Elizabethton, TN (US); Gregory J. Karklins, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 1237 days.

(21) Appl. No.: 11/844,599

(22) Filed: Aug. 24, 2007

(65) Prior Publication Data

US 2008/0127065 A1   May 29, 2008

Related U.S. Application Data

(60) Provisional application No. 60/839,879, filed on Aug. 24, 2006.

(51) Int. Cl.
G06F 9/44 (2006.01)
G05B 19/05 (2006.01)

(52) U.S. Cl.
CPC .... *G05B 19/056* (2013.01); *G05B 2219/13144* (2013.01); *G05B 2219/13133* (2013.01); *G05B 2219/13145* (2013.01); *G05B 2219/13148* (2013.01)
USPC ............................ 717/120; 717/106; 717/124

(58) Field of Classification Search
None
See application file for complete search history.

(56) References Cited

U.S. PATENT DOCUMENTS

| | | | |
|---|---|---|---|
| 5,177,420 A | | 1/1993 | Wada et al. |
| 5,485,620 A | * | 1/1996 | Sadre et al. ................... 717/162 |
| 5,801,942 A | | 9/1998 | Nixon et al. |
| 5,862,052 A | * | 1/1999 | Nixon et al. ...................... 713/1 |
| 5,970,243 A | * | 10/1999 | Klein et al. ................... 717/113 |
| 5,995,744 A | * | 11/1999 | Guccione .......................... 703/23 |
| 6,075,935 A | * | 6/2000 | Ussery et al. ................. 717/106 |
| 6,108,662 A | * | 8/2000 | Hoskins et al. ................. 700/95 |
| 6,157,864 A | * | 12/2000 | Schwenke et al. .............. 700/79 |
| 6,161,051 A | * | 12/2000 | Hafemann et al. .............. 700/86 |
| 6,212,650 B1 | * | 4/2001 | Guccione ........................ 714/32 |

(Continued)

FOREIGN PATENT DOCUMENTS

| | | | |
|---|---|---|---|
| CN | 1515968 | 7/2004 | |
| EP | 1213633 A | 6/2002 | ............ G05B 19/05 |
| WO | 01/16557 | 3/2001 | |
| WO | WO0231607 A2 | 4/2002 | ........... G05B 19/042 |

OTHER PUBLICATIONS

"Mitsubishi Electric Advance Programmable Logic Controllers Edition", Mitsubishi Electric, 1996, <http://www.mitsubishielectric.com/company/rd/advance/pdf/vol76/vol76.pdf>, pp. 1-32.*

(Continued)

*Primary Examiner* — Thuy Dao
*Assistant Examiner* — Samuel Hayim

(57) ABSTRACT

Certain exemplary embodiments comprise a system. The system can comprise a user interface renderer, which can be adapted to render a plurality of distinct user interfaces. Each user interface from the plurality of distinct user interfaces can be adapted to configure a corresponding software application from a plurality of software applications associated with operating a programmable logic controller (PLC).

20 Claims, 20 Drawing Sheets

(56) References Cited

U.S. PATENT DOCUMENTS

| | | | |
|---|---|---|---|
| 6,268,853 B1* | 7/2001 | Hoskins et al. | 700/83 |
| 6,366,300 B1* | 4/2002 | Ohara et al. | 715/771 |
| 6,580,953 B1 | 6/2003 | Wiebe et al. | |
| 6,728,262 B1* | 4/2004 | Woram | 370/466 |
| 6,799,080 B1* | 9/2004 | Hylden et al. | 700/97 |
| 6,813,571 B2* | 11/2004 | Lightbody et al. | 702/62 |
| 6,862,553 B2* | 3/2005 | Schwenke et al. | 702/183 |
| 6,946,984 B2* | 9/2005 | Rubin et al. | 341/141 |
| 7,003,733 B2* | 2/2006 | Duemler | 715/805 |
| 7,024,261 B1* | 4/2006 | Tanton | 700/96 |
| 7,209,851 B2* | 4/2007 | Singh et al. | 702/120 |
| 7,603,183 B1* | 10/2009 | Munemoto | 700/17 |
| 2002/0101451 A1* | 8/2002 | Duemler | 345/764 |
| 2002/0124011 A1* | 9/2002 | Baxter et al. | 707/200 |
| 2002/0124241 A1* | 9/2002 | Grey et al. | 717/106 |
| 2002/0188928 A1* | 12/2002 | Szpak et al. | 717/106 |
| 2002/0194218 A1* | 12/2002 | Klapper et al. | 707/503 |
| 2003/0035005 A1* | 2/2003 | Kodosky et al. | 345/763 |
| 2003/0035006 A1* | 2/2003 | Kodosky et al. | 345/763 |
| 2003/0035009 A1* | 2/2003 | Kodosky et al. | 345/771 |
| 2003/0035010 A1* | 2/2003 | Kodosky et al. | 345/771 |
| 2003/0037316 A1* | 2/2003 | Kodosky et al. | 717/127 |
| 2003/0037322 A1* | 2/2003 | Kodosky et al. | 717/162 |
| 2003/0046663 A1* | 3/2003 | Rogers et al. | 717/125 |
| 2003/0101025 A1* | 5/2003 | Shah et al. | 702/188 |
| 2003/0191593 A1* | 10/2003 | McNutt | 702/75 |
| 2003/0192032 A1* | 10/2003 | Andrade et al. | 717/124 |
| 2004/0044992 A1* | 3/2004 | Muller et al. | 717/124 |
| 2004/0044993 A1* | 3/2004 | Muller et al. | 717/124 |
| 2004/0083456 A1 | 4/2004 | Cornett | |
| 2004/0117535 A1* | 6/2004 | Schaftlein et al. | 710/301 |
| 2004/0128120 A1* | 7/2004 | Coburn et al. | 703/26 |
| 2004/0205715 A1* | 10/2004 | Taylor | 717/120 |
| 2004/0255269 A1 | 12/2004 | Santori | |
| 2005/0022163 A1* | 1/2005 | Brendle et al. | 717/120 |
| 2005/0093711 A1* | 5/2005 | Arcaria et al. | 340/692 |
| 2005/0270063 A1* | 12/2005 | Cornett | 326/39 |
| 2006/0156294 A1* | 7/2006 | Fuller et al. | 717/154 |
| 2006/0168182 A1* | 7/2006 | Fuller et al. | 709/223 |
| 2006/0168183 A1* | 7/2006 | Fuller et al. | 709/223 |
| 2006/0288301 A1 | 12/2006 | Hood | |
| 2007/0073426 A1 | 3/2007 | Chand | |
| 2007/0173959 A1 | 7/2007 | Chandhoke | |

OTHER PUBLICATIONS

G. Flor et al., "Graphical User Interface of RFX Control and Data Acquisition System", IEEE, 1993, <http://ieeexplore.ieee.org/stamp/stamp.jsp?tp=&arnumber=518400>, pp. 1-4.*

Flavio Bonfatti et al., "Re-usable Software Design for Programmable Logic Controllers", ACM, 1995, <http://delivery.acm.org/10.1145/220000/216651/p31-bonfatti.pdf>, pp. 1-10.*

Moeller, GMBH, dated Apr. 2001.

International Search Report dated Aug. 24, 2007 for PCT/US2007018834.

Office Action dated Mar. 7, 2012, from Chinese Patent Office for related application, pp. 1-15 only.

* cited by examiner

9000

Network Read

The Network Read instruction transfers data from the a remote PLC to the specified local address.

| | |
|---|---|
| Port: | 0 |
| Remote Station: | 2 |
| Remote Buffer: | VB100 |
| Length: | 255 Bytes |
| Timeout: | 500 MS |
| Local Buffer: | VB777 |

| | | |
|---|---|---|
| DONE | OUT | BOOLEAN |
| ACTIVE | OUT | BOOLEAN |
| ERROR | OUT | BOOLEAN |

This is an optional user comment. It can be a long comment. The tooltip will support only a limited number of lines, say 5 lines, before you need to use the More button view the remainder of the ...

FIG. 16

FIG. 17
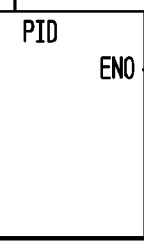
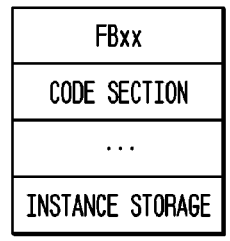

20000

DEVICES, SYSTEMS, AND METHODS FOR CONFIGURING A PROGRAMMABLE LOGIC CONTROLLER

CROSS-REFERENCES TO RELATED APPLICATIONS

This application claims priority to, and incorporates by reference herein in its entirety, U.S. Provisional Patent Application Ser. No. 60/839,879, filed 24 Aug. 2006.

BACKGROUND

Control systems can be used for monitoring parameters and/or controlling devices. Within control systems, one or more sensors can be communicatively coupled to a programmable logic controller (PLC) via one or more input/output (I/O) modules. Via an I/O module, the PLC can control one or more devices, such as a rheostat, switch, sequencer, stepper motor controller, servo controller, actuator controller, stepper drive, servo drive, stepper motor, servomotor, linear motor, motor, ball screw, servo valve, hydraulic actuator, and/or pneumatic valve, etc. Configuration of the PLC, system components, and/or firmware or software associated therewith can be important activities regarding monitoring sensors and/or controlling devices.

SUMMARY

Certain exemplary embodiments comprise a system. The system can comprise a user interface renderer, which can be adapted to render a plurality of distinct user interfaces. Each user interface from the plurality of distinct user interfaces can be adapted to configure a corresponding software application from a plurality of software applications associated with operating a programmable logic controller (PLC).

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 16 is an exemplary user interface;
FIG. 17 is an exemplary user interface.

DETAILED DESCRIPTION

Certain exemplary embodiments can provide a system. The system can comprise a user interface renderer, which can be adapted to render a plurality of distinct user interfaces. Each user interface from the plurality of distinct user interfaces can be adapted to configure a corresponding software application from a plurality of software applications associated with operating a programmable logic controller (PLC).

Figure 1:
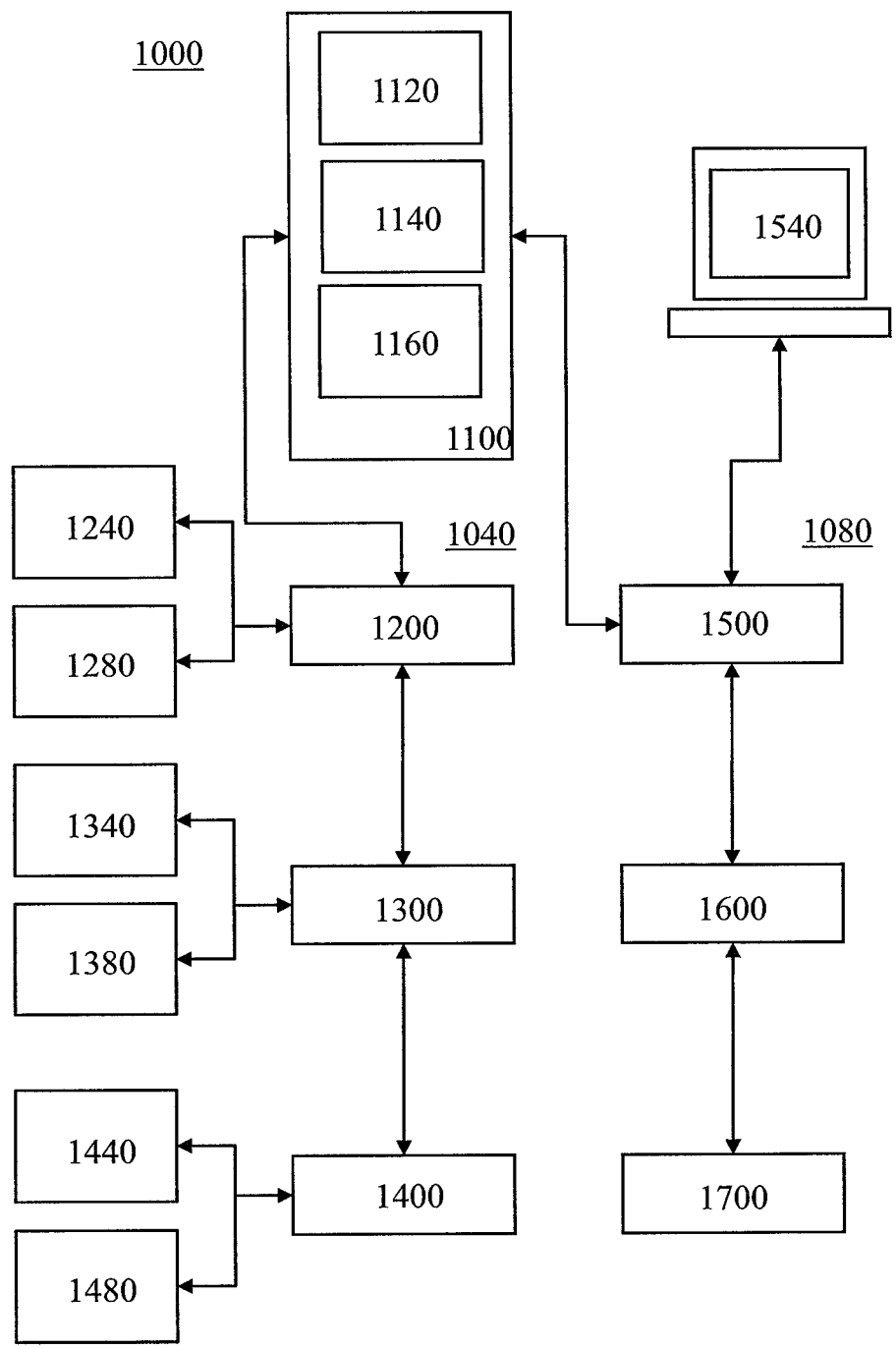
FIG. 1 is a block diagram of an exemplary embodiment of a system 1000.

FIG. 1 is a block diagram of an exemplary embodiment of a system 1000, which can comprise a PLC 1100. PLC 1100 can comprise a circuit 1120. Circuit 1120 can be adapted to automatically perform any method or activity described herein. For example, circuit 1120 can be adapted to communicatively couple PLC 1100 to a first chain of modules 1040, which can comprise a first module 1200, a second module 1300, and a third module 1400. First module 1200, second module 1300, and third module 1400 can be communicatively coupled in a series arrangement. Each adjacent pair of first chain of modules 1040, such as first module 1200 and second module 1300 can be communicatively coupled in series. Each of first module 1200, second module 1300, and third module 1400 can be, and/or can be referred to as, I/O modules and/or I/O expansion modules, which can each be communicatively coupled to a corresponding plurality of sensors, such as a first sensor 1240, a second sensor 1340, and a third sensor 1440. Each of first module 1200, second module 1300, and third module 1400 can be communicatively coupled to a corresponding plurality of actuators such as a first actuator 1280, a second actuator 1380, and a third actuator 1480. Each of first module 1200, second module 1300, and/or third module 1400 can be adapted to communicate with PLC 1100 in hard real-time.

PLC 1100 can be communicatively coupled to a second chain of modules 1080, which can comprise a fourth module 1500, a fifth module 1600, and a sixth module 1700, which can be communicatively coupled in a series arrangement. Each adjacent pair of second chain of modules 1080, such as fourth module 1500 and fifth module 1600 can be communicatively coupled in series. Fourth module 1500, fifth module 1600, and sixth module 1700 can be, and/or can be referred to as, communications modules and/or annex modules, each of which can be communicatively coupled to a plurality of information devices, such as an information device 1540 (illustrated as being communicatively coupled to fourth module 1500).

Programmable logic controllers can be used for monitoring parameters and/or controlling devices. Certain exemplary systems can incorporate one or more sensors, such as first sensor 1240, second sensor 1340, and third sensor 1440, which can be communicatively coupled to a PLC 1100. Certain exemplary systems can comprise devices controllable by the PLC, such as first actuator 1280, a second actuator 1380, and a third actuator 1480. In certain exemplary embodiments, PLC 1100 can communicate with sensors and/or controlled devices via one or more input/output (I/O) buses.

In certain exemplary embodiments, system 1000 and/or a device communicatively coupled thereto can comprise circuit 1120 and/or a user interface renderer 1140. Circuit 1120 and/or user interface renderer 1140 can be adapted to cause a plurality of distinct user interfaces to be rendered. Each user interface from the plurality of distinct user interfaces can be adapted to configure a corresponding software application from a plurality of software applications associated with controlling and/or operating a programmable logic controller (PLC). User interface renderer 1140 can be adapted to change at least one of the plurality of distinct user interfaces responsive to an automatic detection of access rights associated with the user. At least one of the plurality of distinct user interfaces can be adapted to cause an automatic comparison of at least one value of a received configuration input to a predetermined value and/or a predetermined range of values. User interface renderer 1140 can be adapted to initially render one of the plurality of user interfaces responsive to a placement of a corresponding icon of a hierarchically-organized instruction tree in proximity to and/or in an editor and/or a rendered editor icon. User interface renderer 1140 can be adapted to provide a subsequent rendering of the user interface that comprises values modified via the configuration input.

At least one of the plurality of distinct user interfaces can be adapted to cause an automatic generation of a proportional/integral/derivative (PID) control procedure. The proportional/integral/derivative (PID) control procedure can be adapted to be executed by PLC 1100. At least one of the plurality of distinct user interfaces can be adapted to cause an automatic generation of a high-speed counting procedure and/or a high speed control procedure. The high-speed counting procedure and/or the high speed control procedure can be adapted to be executed by PLC 1100. At least one of the plurality of distinct user interfaces can be adapted to cause an automatic configuration of one or more non-PLC devices, such as first module 1200, second module 1300, third module 1400, fourth module 1500, fifth module 1600, and sixth module 1700, one or more of which can be communicatively coupled to PLC 1100. One or more of first module 1200, second module 1300, third module 1400, fourth module 1500, fifth module 1600, and sixth module 1700 can be a communication module. At least one of the plurality of distinct user interfaces can be adapted to cause an automatic generation of a report indicative of automatically determined differences between a first version of the control program and a second version of the control program of the PLC.

For a selected software application from the plurality of software applications, user interface renderer 1140 can be adapted to automatically provide a first user interface if the PLC is executing a control program and a second user interface if the PLC is not executing the control program. The selected software application can be selected based upon a specified configuration. User interface renderer 1140 might not use a PLC language editor to configure the selected software application. The selected software application can be adapted to be referenced via an automatically rendered hierarchically-organized instruction tree. The instruction tree can be indicative of an organized structure associated with available PLC machine instructions. The first user interface can be adapted to provide a current set of configuration parameters associated with the selected software application. The first user interface can be adapted to receive a configuration input from the user. Responsive to the configuration input, the first user interface can be adapted to change one or more configuration parameters from the current set of configuration parameters. The second user interface can be adapted to facilitate debugging the selected software application. The second user interface can be adapted to receive a debugging input from a user.

User interface renderer 1140 can be adapted to render each of the plurality of user interfaces responsive to meta-data obtained from a hierarchical representation of the plurality of software applications, such as meta-data associated with a hierarchical tree. User interface renderer 1140 can be adapted to be modified to add at least one user interface to the plurality of user interfaces without changing a control program of the PLC.

In certain exemplary embodiments, one or more of first module 1200, second module 1300, third module 1400, fourth module 1500, fifth module 1600, and sixth module 1700 can be adapted to be configured via one of the plurality of distinct user interfaces.

In certain exemplary embodiments, system 1000 and/or a device communicatively coupled thereto can comprise a software generator 1160. Software generator 1160 can be adapted to automatically generate a PLC application responsive to information provided via at least one of the plurality of user interfaces.

PLCs can be used to solve complex application tasks. Exemplary application tasks can comprise:

- In proportional/integral/derivative (PID) control, PID loops can be used in applications adapted to control a certain measurement to a predetermined setpoint. Examples of PID control can comprise maintaining control of a temperature and/or maintaining a constant flow rate. A PID algorithm can be adapted to measure current values of a variable being controlled and automatically adjust control parameters in an attempt to maintain a consistent temperature and/or flow.
- In certain exemplary manufacturing operations, a high speed count might be desired of often require the measurement of events that occur at very high speeds. When the count reaches a certain value, certain applications can be adapted to control one or more variables in a process. Certain exemplary embodiments can be adapted to measure and/or count electrical pulses at a rate of approximately 200 kilohertz or approximately every 5 microseconds. In certain exemplary embodiments, relatively high speed operations can be counted and/or controlled.
- Certain exemplary embodiments can be adapted to communicate with one or more non-PLC devices employed to assist in automation related tasks. Certain exemplary embodiments can support custom communication protocols. For example, weigh scales, temperature transmitters, differential transmitters, ink-jet printers, and/or vision systems can each communicate with a specific, custom communication protocol. In order for the PLC to communicate to these types of devices, the PLC can be adapted to communicate with each custom protocol. Certain exemplary embodiments can support Freeport communications. Utilizing Freeport communications, a PLC application of a customer can be developed to control a communication Universal Asynchronous Receiver Transmitter (UART). In certain exemplary embodiments, the UART can be configured and/or controlled consistent with a custom communication protocol of a unique device.

In certain exemplary embodiments, a custom PLC application control program can be developed to take advantage of a generic capability provided by the PLC. The application program can be customer created software that controls electrical inputs and outputs of the PLC.

Application control programs created by a customer can be relatively complex. Setting up a configuration within the PLC can be relatively complex. Engineering Station (ES) software, such as Step-7 or Step-7 Micro-WIN, and/or a user interface renderer can be adapted to provide a view and interface to the customer into the PLC. The ES can be adapted for a user to configure the PLC and/or create a custom application program.

The ES can be adapted for the customer to create applications using the above capabilities. In some instances, such as Freeport, the customer can program the actual PLC memory locations in order to utilize the capability. In other cases, application wizards might be provided via the user interface renderer to help moderate the complexity of creating these applications.

For some control tasks, a customer can configure certain variables, such as those shown below in Table I specifically through application code. Once a configuration is complete, the customer can insert programming instructions into the application code in order to initiate one or more desired operations. For Freeport, these instructions might be named XMT (Transmit) and RCV (Receive).

TABLE 1

| Memory Location | Field | Format | Type | Description |
| --- | --- | --- | --- | --- |
| SMB1 | Freeport Status Bits | Bits | Output | Potential Freeport error indicators. |
| SMB2 | Received Character | Byte | Output | Contains each character that is received from Port 0 or Port 1 during Freeport communications. |
| SM3.0 | Freeport Parity Bit | Bit | Output | Parity error from Port 0 or Port 1 was detected. |
| SM4.0 | Overflow Bit | Bit | Output | This bit is enabled when the communications interrupt queue has overflowed. |
| SMB30 | Control Register | Bits | Input | Freeport control registers for Port 0 |
| SMB86 | Receive Message Status | Bits | Output | Receive message status |
| SMB87 | Receive Message Control | Bits | Input | Receive message control |
| SMB88 | Start Character | Byte | Input | Start of message character |
| SMB89 | End Character | Byte | Input | End of message character |
| SMW90 | Idle line time | Word | Input | Idle line time period given in milliseconds. The first character received after the idle line time has expired is the start of a new message. |
| SMW92 | Inter-character time | Word | Input | Inter-character/message timer time-out value in milliseconds. If the timer period is exceeded, the receive message is terminated. |
| SMW94 | Maximum chars | Word | Input | The maximum number of characters to be received. Please note that this range must be set to the expected maximum buffer size, even if the |
| SMB130 | Control Register | Bits | Input | Freeport control registers for Port 1 |
| SMB186 | Receive Message Status | Bits | Output | Receive message status |
| SMB187 | Receive Message Control | Bits | Input | Receive message control |
| SMB188 | Start Character | Byte | Input | Start of message character |
| SMB189 | End Character | Byte | Input | End of message character |
| SMW190 | Idle line time | Word | Input | Idle line time period given in milliseconds. The first character received after the idle line time has expired is the start of a new message. |
| SMW192 | Inter-character time | Word | Input | Inter-character/message timer time-out value in milliseconds. If the timer period is exceeded, the receive message is terminated. |
| SMW194 | Maximum chars | Word | Input | The maximum number of characters to be received. Please note that this range must be set to the expected maximum buffer size, even if the |

For other control tasks, configuration capabilities can be provided in the form of wizards (i.e. graphical user interfaces). Wizards can be adapted to assist the customer to configure the application. An as example, a portion of the PID wizard is illustrated in FIG. 2 and FIG. 3.

Figure 2:
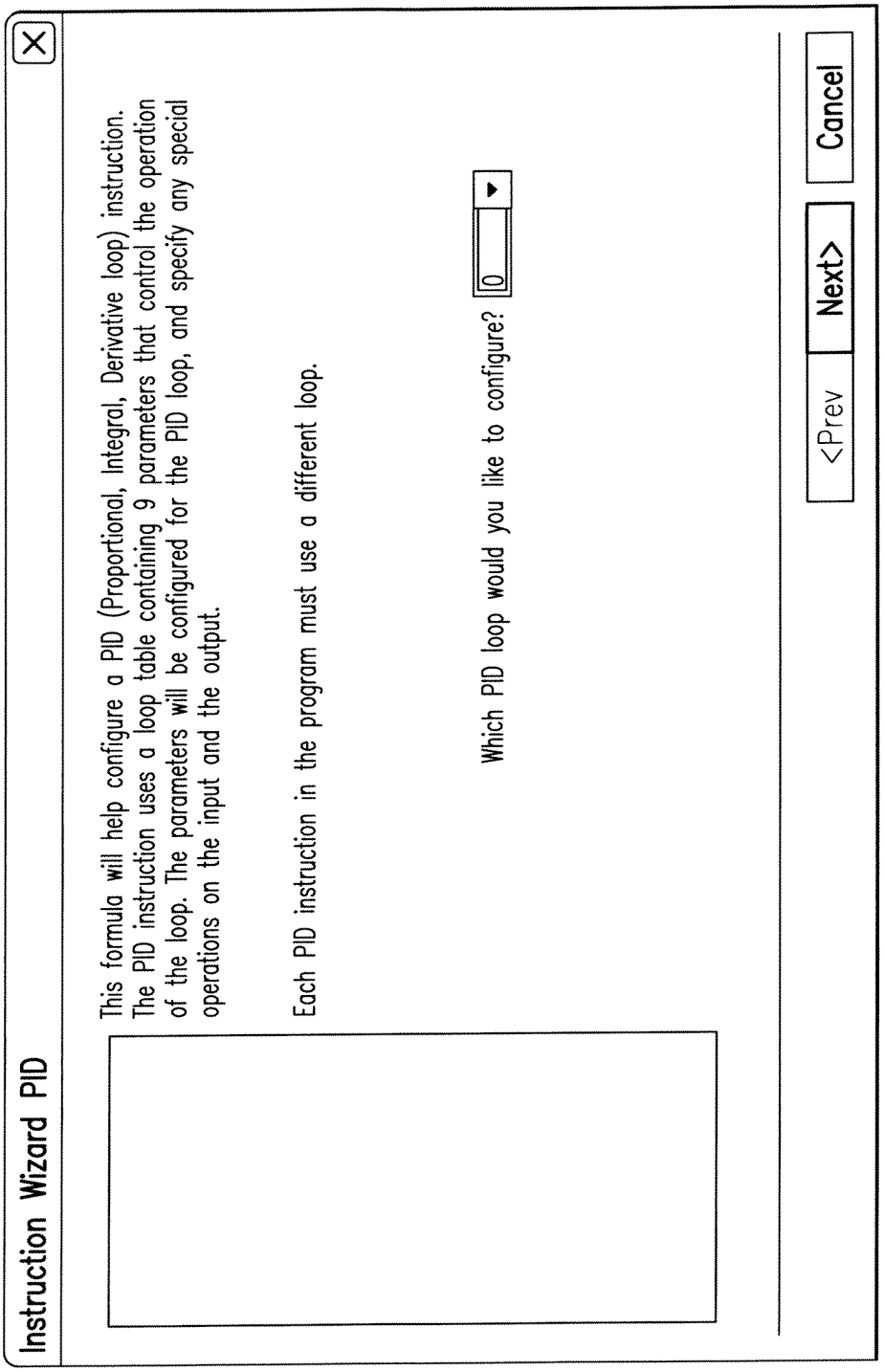
FIG. 2 is an exemplary user interface.
Figure 3:
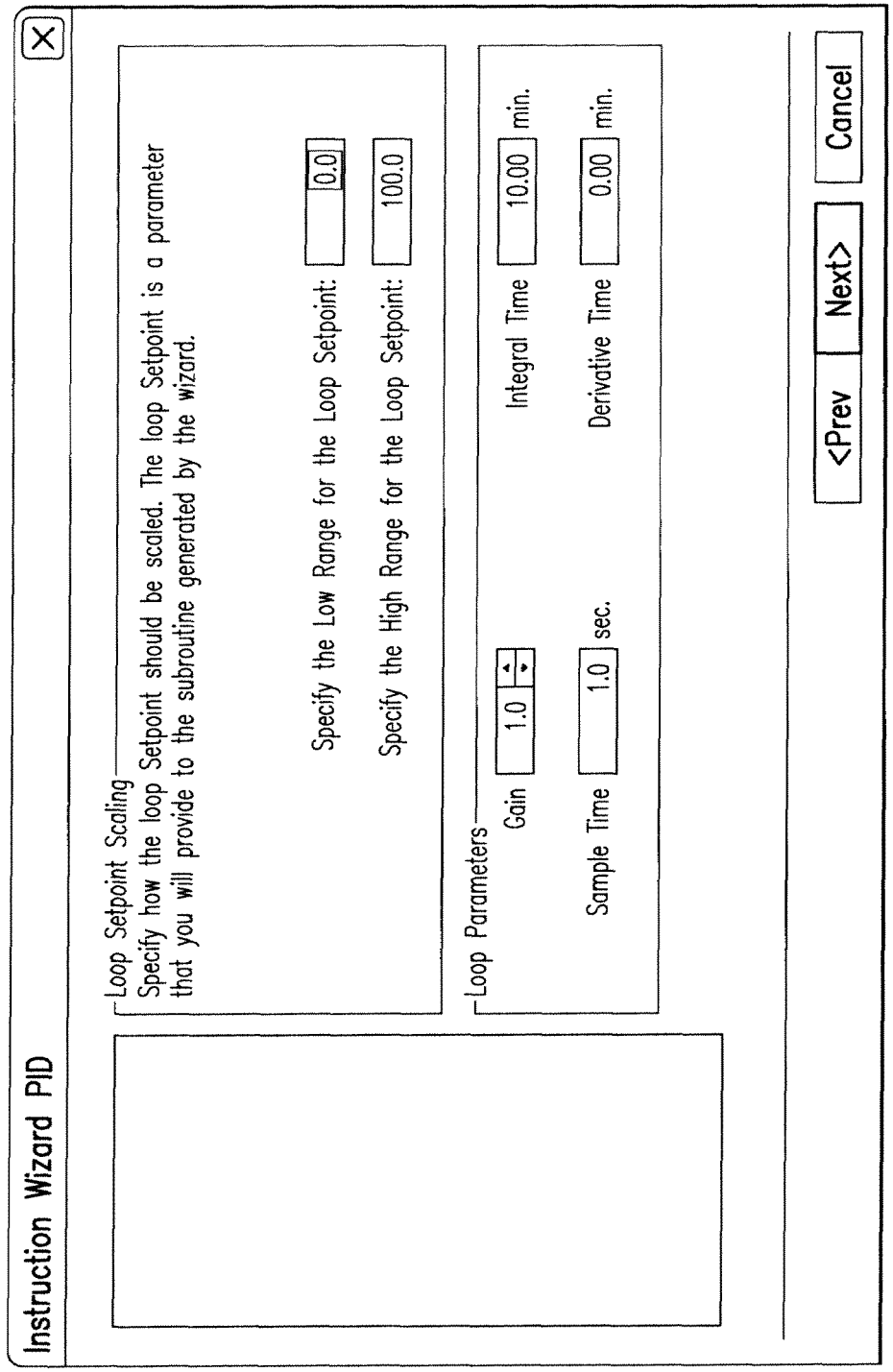
FIG. 3 is an exemplary user interface.

FIG. 2 and FIG. 3 are exemplary user interfaces. A wizard can be executed independently, separately from a corresponding application program. The configuration created by executing this wizard can be visible within this form. The configuration might not be visible from a context of the application program. In certain exemplary embodiments, a first user interface, such as the user interface of FIG. 2 can be provided for configuration of an exemplary PID control. Responsive to one or more user inputs, the user interface of FIG. 3 can be provided, via which a user can provide additional inputs related to the PID control.

Figure 4:
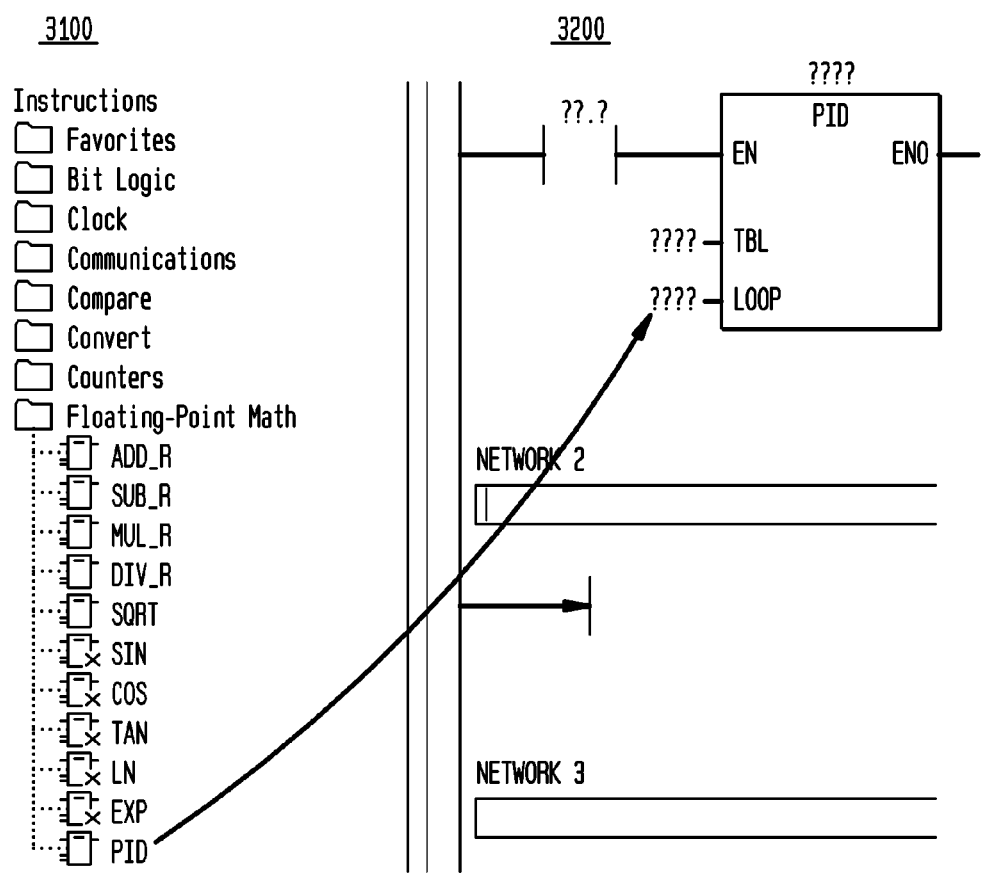
FIG. 4 is an exemplary user interface.

FIG. 4 is an exemplary user interface, which can comprise an instruction tree 3100. As a result, when an instruction is dropped from an ES instruction tree into a selected editor, such as editor 3200, a configuration might not be visible. The configuration can be accessible separately from the wizard.

In certain exemplary embodiments, the application programming and configuration of complex application tasks can be simplified in relative terms. Complex application tasks can be implemented and configured through the "Smart Clients" and the configuration can be accomplished via instructions.

Certain exemplary embodiments permit dropping an instruction into an editor and causing the configuration by double-clicking upon the instruction. This sequence is illustrated below in FIG. 5.

Figure 5:
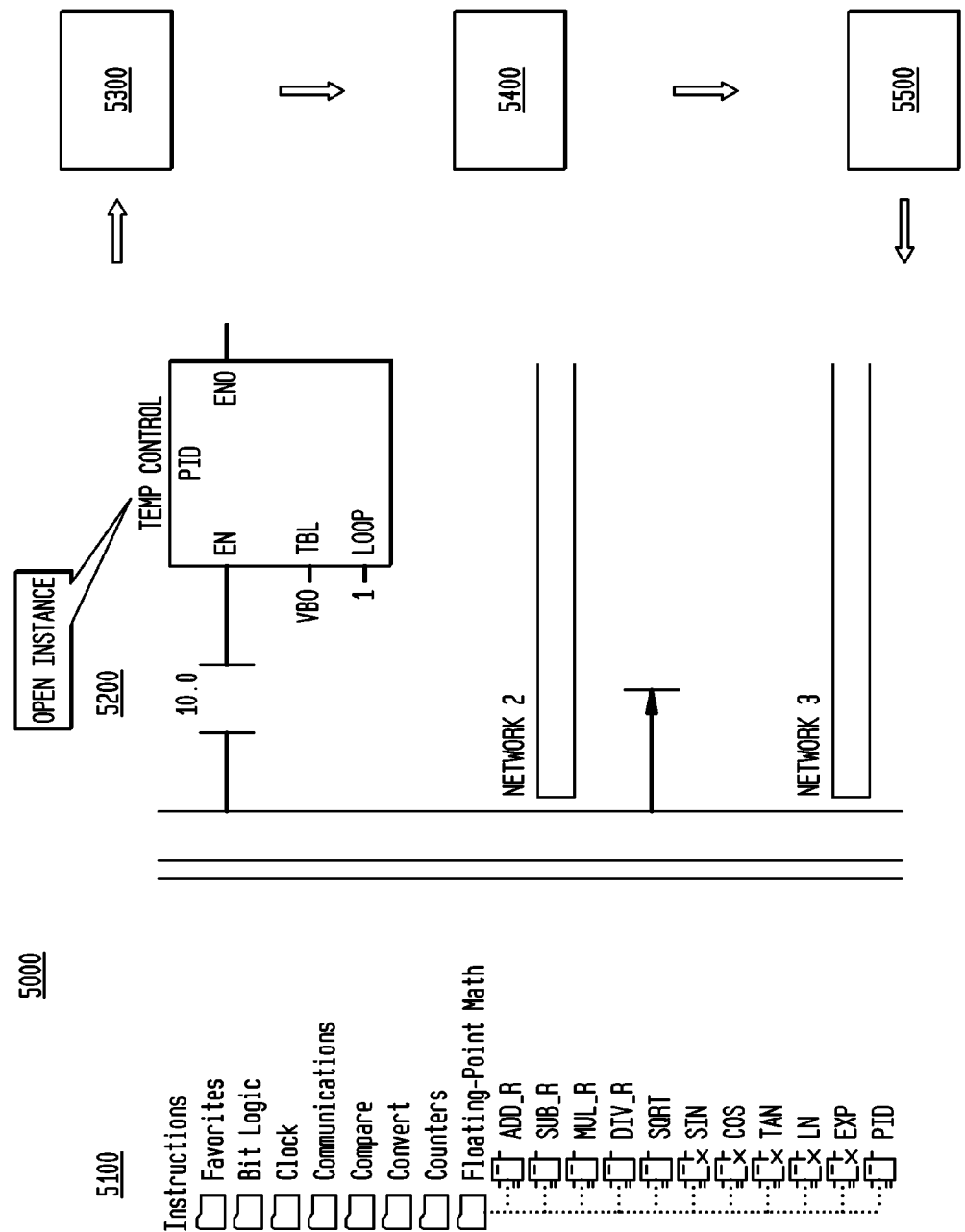
FIG. 5 is an exemplary set of user interfaces 5000.

FIG. 5 is an exemplary set of user interfaces 5000, which can comprise an instruction tree 5100 and an editor 5200. Via instruction tree 5100 and/or editor 5200, a predetermined set of distinct user interfaces, such as first user interface 5300, second user interface 5400, and third user interface 5500 can be provided and/or rendered to a user. The opening of an instance of an instruction can be context sensitive. When double-clicking upon the instruction while performing program edits, the configuration context can be activated, as illustrated in FIG. 5. Responsive to user inputs provided via first user interface 5300, second user interface 5400, and third user interface 5500, an instruction tree context can change, which can result in one or more visible or invisible changes to instruction tree user 5100.

Figure 6:
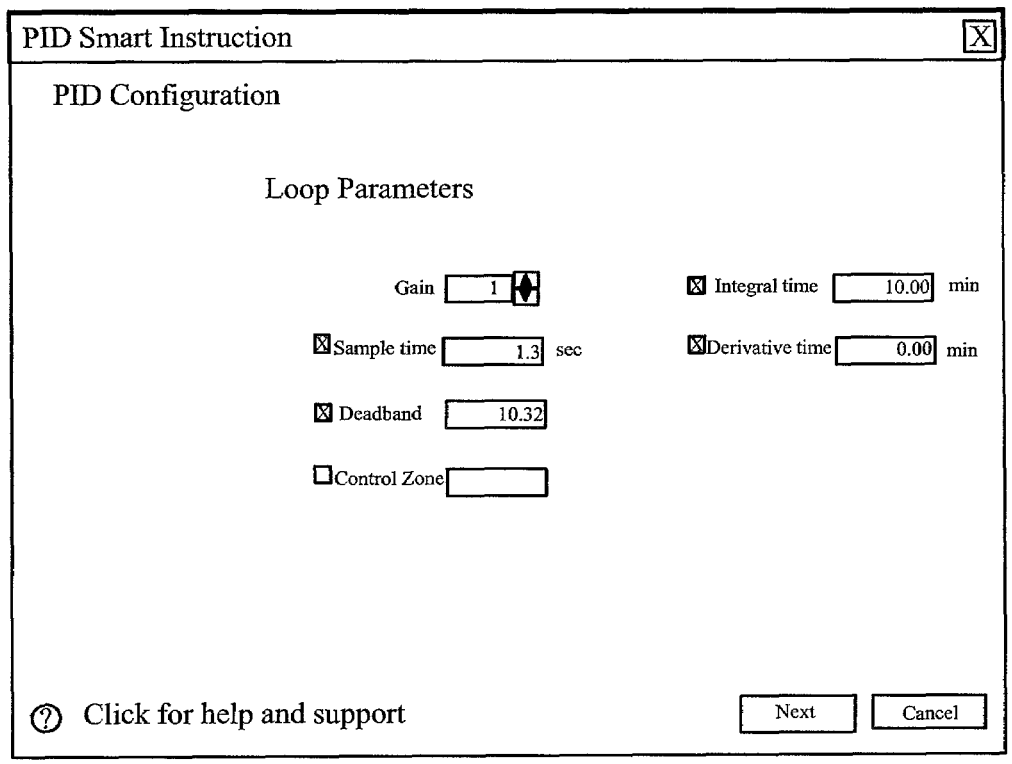
FIG. 6 is an exemplary user interface.
Figure 7:
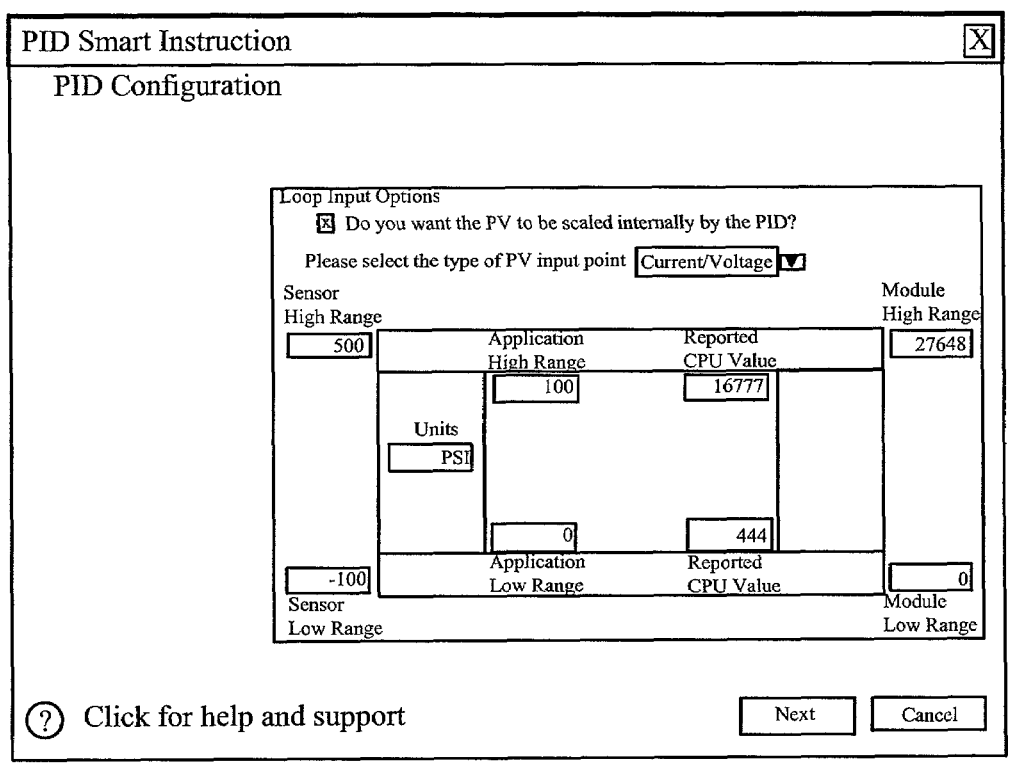
FIG. 7 is an exemplary user interface.
Figure 8:
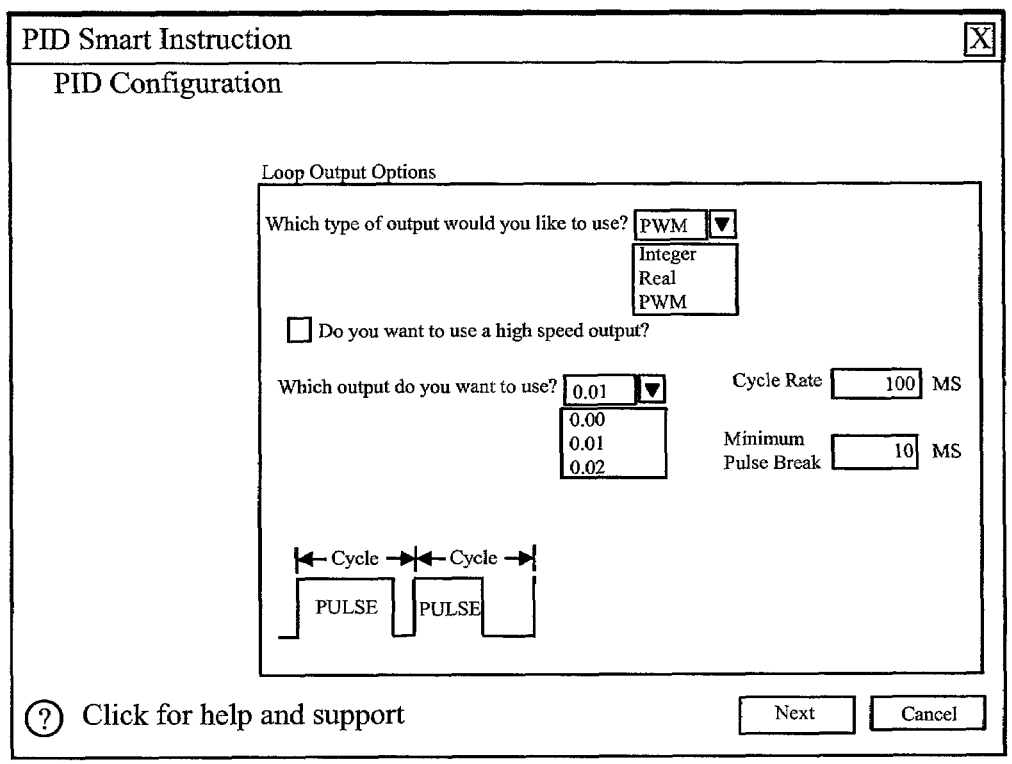
FIG. 8 is an exemplary user interface.

FIG. 6 is an exemplary user interface that corresponds to first user interface 5300 of FIG. 5. FIG. 7 is an exemplary user interface that corresponds to first user interface 5400 of FIG. 5. FIG. 8 is an exemplary user interface that corresponds to first user interface 5500 of FIG. 5.

Figure 9:
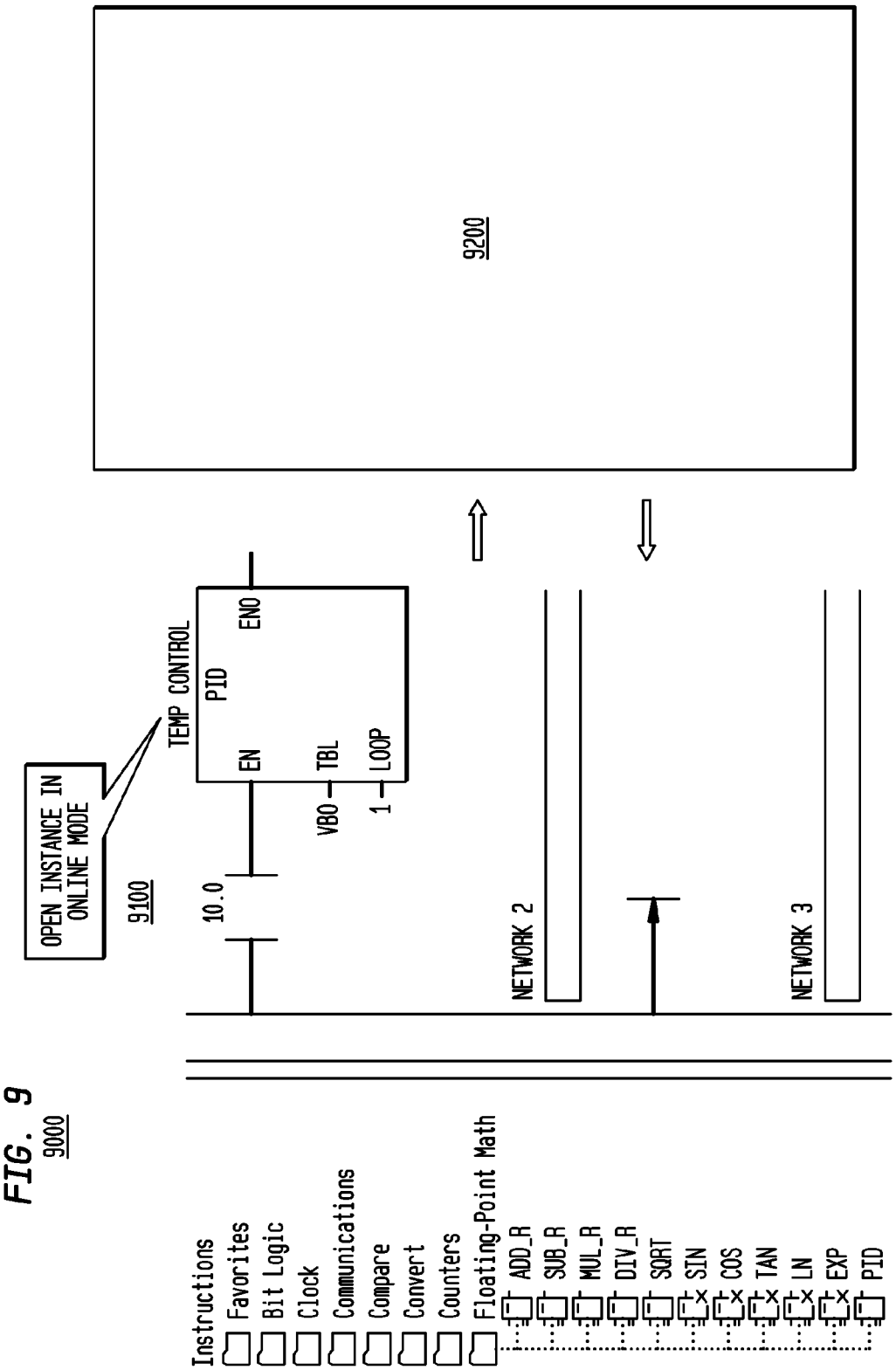
FIG. 9 is an exemplary set of user interfaces 9000.
Figure 10:
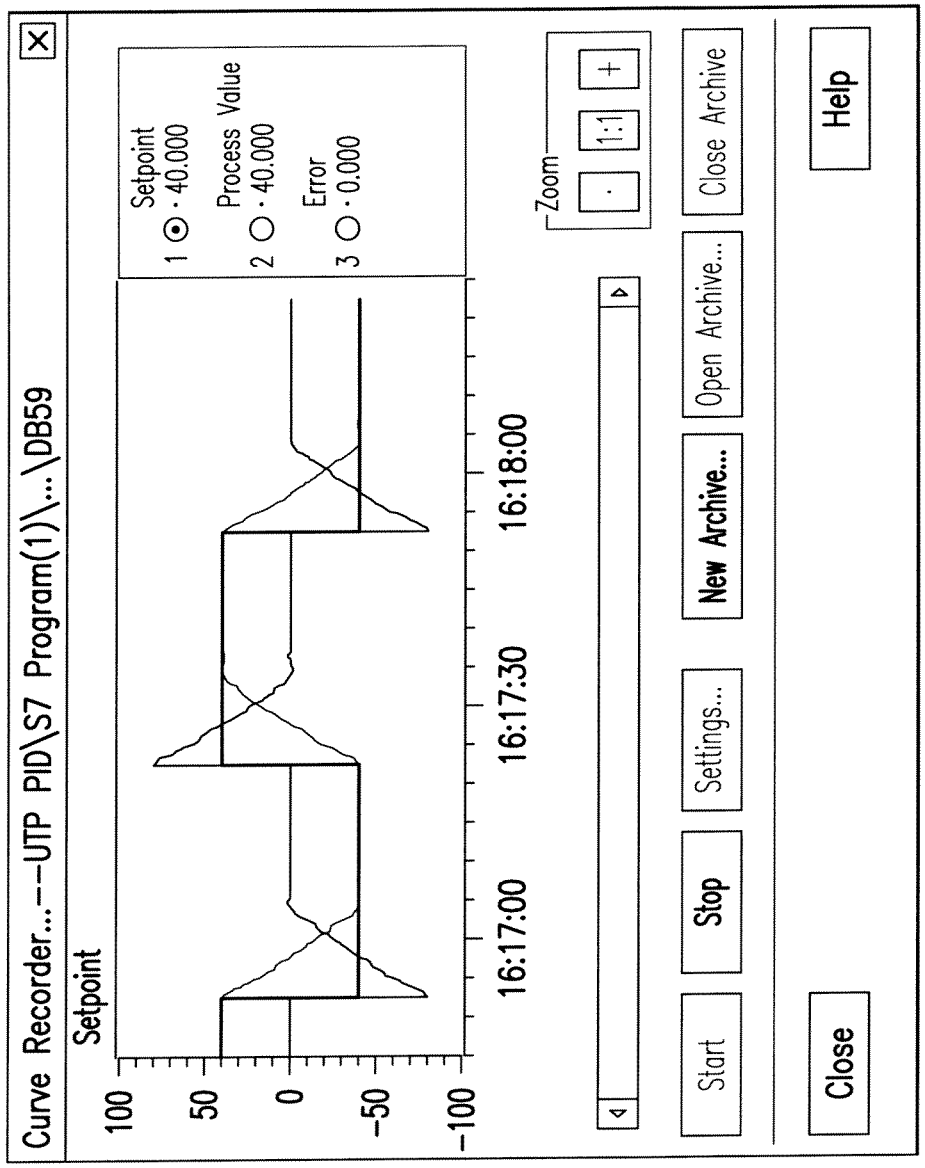
FIG. 10 is an exemplary user interface.

FIG. 9 is an exemplary set of user interfaces 9000, which can comprise a first user interface 9000 and a second user interface 9200. User interface 9000 can comprise an instruction icon 9100. In certain exemplary embodiments, when double-clicking upon instruction icon 9100 while performing program debugging, the displayed context can be different than when not performing debugging. FIG. 10 is an exemplary user interface that corresponds to user interface 9100 of FIG. 9, which can be illustrative of a user interface provided during debugging. User interface 9100 can comprise a trend chart indicative of performance of one or more application programs related to the debugging.

Certain exemplary embodiments can, in relative terms, simplify the customer's configuration of complex application tasks by providing context sensitive, user interface elements that graphically lead the customer through the configuration process.

Certain exemplary embodiments can associate a particular configuration with each instance of a given application "Smart Client". Double-clicking upon each instance of "Smart Client" can provide a context sensitive, user interface environment that can be adapted to assist in configuring or debugging the user's application.

Smart Client Customization can define a means to customize one or more standard functionalities by adding so called Smart Clients to a system. From a user's point-of-view these Smart Clients can be qualified by either of the following: Smart Clients can be objects that augment standard functionality provided by Step 7+; and/or Smart Clients can be objects that provide a simplified user interface to the customer.

From the system's point-of-view, Smart Clients can be extensions of standard Step 7+ objects that provide extra functionality. Smart Client Customization can specify a collection of rules and/or recommendations that can be adapted to enable a developer to add extra system functionality. Examples of such extra functionality can comprise:

grouping of specialized configuration sequences such as PID controllers, High Speed Counters, or hardware modules;

improved rendering and representation such as graphical display of controller settings instead of a table view of instance DB values; and/or additional configuration rules such as checking and enforcing instance values between certain ranges or calculating instance values based upon customer specified configurations, etc.

Within the language editors, Smart Clients might be used in rung or network programming. Certain exemplary embodiments can utilize a call to a block that comprises the functionality of the Smart Client. These instances can utilize:

instantiation of a new Smart Client instance;

instance modification of a Smart Client's configuration; and/or instance visualization of a Smart Client's online state, etc.

The instantiation of such Smart Clients can comprise:

dragging and dropping a Smart Client from an instruction list or task card into the rung or network; and/or filling in any configuration or parameterization property page, etc.

This can result in a call (or inline code) and further data or objects (blocks) comprising an exemplary operation for this instance of the Smart Client. The following figure illustrates an exemplary embodiment of a procedure, a PID controller provided as such a Smart Client might perform, when instantiated.

A modification of a Smart Client instance can comprise one or more of the following steps:

the instance in question can be opened (by double click or context menu or appropriate action); and/or instead of starting a block editor, the Smart Client can be invoked to re-run configuration, etc.

This can result in a modification on the call or further data or objects representing the instance of FIG. 5.

An instance visualization of a Smart Client can comprise one or more of the following steps:

the instance in question can be opened for visualization (by the appropriate action); and/or instead of starting a block editor, the Smart Client can perform its specific instance visualization, etc.

This can result in the Smart Client's specific visualization functionality to be performed as illustrated in FIG. 9.

Whether the particular instance will be opened for online visualization or for offline visualization can be determined by the editor's current state. If the editor is in online state when opening the instance for visualization, the Smart Client can be asked to conduct online visualization. If the editor is in offline state, offline visualization can be initiated.

Within hardware configuration editors, Smart Clients can be used to configure built-in central processing unit (CPU) features such as high-speed counter configuration or external hardware modules such as Internet modules. Certain exemplary embodiments can configure hardware modules that might be too complicated to be supported by master device description(s) (MDD) or generic station description (GSD) configurations alone. Master device description(s) and generic station description can describe capabilities of an individual hardware device.

Figure 11:
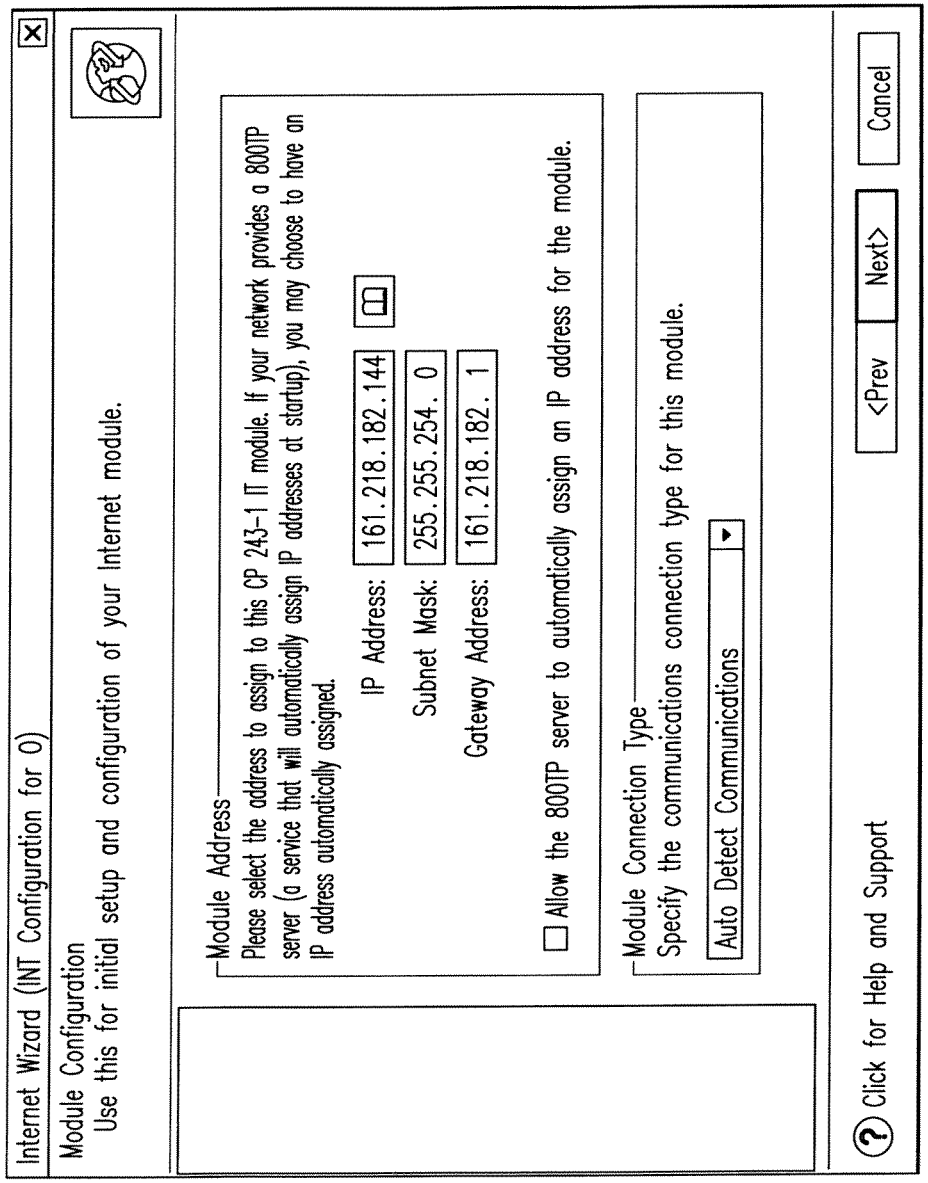
FIG. 11 is an exemplary user interface.

FIG. 11 is an exemplary user interface that can be adapted to obtain information from a user which can be used to configure a module of a PLC system. The user interface can prompt a user to provide an IP address, a subnet mask, a gateway address, and/or a module connection type associated with the module. In certain exemplary embodiments, information obtained via the user interface can be used to configure the module and/or communicatively couple the module to the PLC system.

A Smart Client can offer programmatic support for a developer. Certain exemplary embodiments can utilize one or more of:
  instantiation;
  instance modification; and/or
  instance visualization (online), etc.

The instantiation of a Smart Client can be performed by a drag and drop from a module list (task card showing available modules) into the hardware configuration pane. Certain exemplary embodiments can comprise property pages adapted to specify the module's parameterization. Certain exemplary embodiments can provide a device parameterization of the specific device or module.

Modification of Smart Client instances can comprise one or more of the following steps:
  the module instance can be opened (by double click or context menu or appropriate action); and/or
  the Smart Client can be invoked to re-run module configuration/parameterization, etc.

Certain exemplary embodiments can provide a modified device configuration. An instantiation visualization of module-related Smart Clients can comprise one or more of the following steps:
  the instance in question can be opened (by double click or context menu or appropriate action); and/or
  the Smart Client can be invoked to perform its specific module visualization, etc.

Certain exemplary embodiments can provide a Smart Client's specific visualization functionality.

For some Smart Clients, a type of context-less use can comprise wizard type operations. Such a wizard might be designed to generate an entire program or hardware configuration and can be started without a specific context to a selected object. Instead the wizard can interrogate the context prior to starting.

Figure 12:
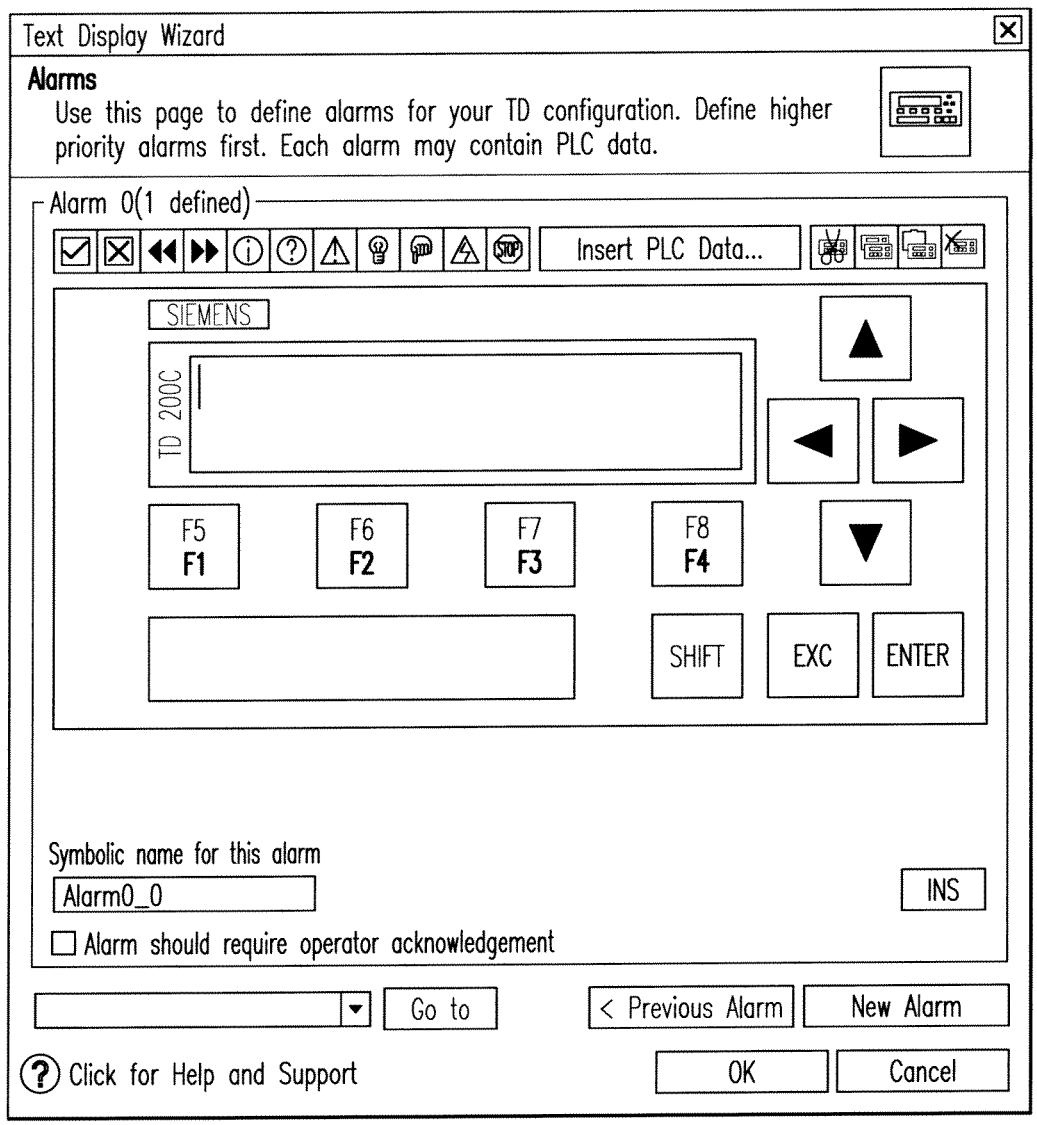
FIG. 12 is an exemplary user interface.

FIG. 12 is an exemplary user interface, which can be adapted to receive one or more inputs from the user related to configuring alarms associated with the PLC system. The user interface can comprise a plurality of logical buttons and/or input fields associated with configuring the alarms.

Certain exemplary embodiments can be integrated into the Platform by the addition of a Main Menu entry named "Tools" or "Wizards". In certain exemplary embodiments, a menu can comprise a list of currently installed Smart Clients. Upon activation, certain exemplary Smart Clients can determine their operating context.

The following can be a set of Smart Client characteristics for certain exemplary embodiments. These are services that might be utilized by add-on client applications or controls in order to perform specific, value-added customizations.

Access Objects and Services Access to STEP 7+ project related services. These services can comprise one or more of the following:
  an ability to programmatically create certain types of blocks (OB, DB, system data block (SDB), FC, function block (FB);
  an ability to programmatically delete certain types of blocks (OB, DB, SDB, FC, FB);
  an ability to specify and modify block properties comprising block privileges (read only, hidden, etc.);
  an ability to programmatically generate and manage tag references;
  an ability to programmatically generate and manage variable table; and/or
  certain object types represented within the object frame can be accessible, etc.

Regarding custom client objects, it might be desired that language-related Smart Clients have a similar appearance and behave in a similar manner to typical box instructions in both the instruction tree and editor.

Regarding instruction properties certain exemplary embodiments can distinguish a Smart Client from a normal box instruction to indicate that additional configuration might be utilized in associated property pages. This could be accomplished by including custom icons in the instruction tree and some other distinguishing characteristic within the instruction in the editor.

Regarding instruction encoding and code generation, it might be desired that language-related Smart Clients behave as native box instructions. However, the code that is generated for these instructions can be inline code and/or code contained within an FC or FB. For example, the PID Smart Instruction can create a cyclic execution OB which can execute the actual PID instruction. Additional scheduling code can be added to separate execution of different PID instructions across different PLC scans.

Smart Clients can be able to persistently store information configured by a customer. Custom objects can be able to integrate with other standard services such as cross-reference, printing, undo, redo, find/replace, etc. Custom clients can be able to perform offline and online reads and writes of DBs and IDBs members. Today in STEP 7, symbol names for customer-defined functions (FBs, FCs) can be unique. This also comprises data blocks (DBs). In certain exemplary embodiments, symbolic references of FCs/FBs and DBs can have the same name. This can allow any DBs used internally within a FC or with a FB to be visually associated since the symbolic reference might be exactly the same. Language-related Smart Clients can appear in the instruction tree just as native instructions. However, dropping these instructions might result in a FC or FB being instantiated into the project. When FCs or FBs are used, dropping of the instruction might generate a unique instance name. Additionally, the Smart Client designer might be adapted for a customer to specify a custom name.

Uploads can re-create certain Smart Client objects. Upon uploading into a new project, Smart Clients can be re-configured through their associated property pages. Exporting and subsequent importing can also re-create all Smart Client objects. Upon importing into a new project, Smart Clients can be able to be re-configured through their associated property pages. In certain exemplary embodiments, visual representation of language-related Smart Clients can display information configured through property pages. Certain important information can be displayed without having to instantiate the property pages. Certain exemplary embodiments can comprise information inside the box instruction or within a specialized type of tooltip. A Smart Client can augment the Platform and/or other editor's context menus.

In certain exemplary embodiments, language-related Smart Client program can display information configured through property pages. In certain exemplary embodiments, information can be displayed without having to instantiate the property pages. This might be accomplished by including important information inside box instruction or within a specialized type of tooltip. In certain exemplary embodiments, current hardware configuration can be accessible from Smart Clients. In certain exemplary embodiments, the instruction to present configuration options can be based upon currently configured hardware. An example of this might be peer-to-peer communication instructions. These instructions might offer network selections for hardware that is currently configured.

Smart Clients can support Cut/Copy/Paste (CCP). When these operations are performed on Smart Clients, certain associated project components of the Smart Clients can be managed. Project components can vary depending upon the Smart Clients. These might be inline code, FCs, or FBs. Cut operations can delete the Smart Client and its associated components. However, there might be more than one instance of a Smart Client that also has references to existing components. copy and paste operations can vary depending upon the Smart Client. Inline code can be copied. FCs and FBs can copy the call to the block. Smart Clients can support undo and redo operations. When these operations are performed on language-related Smart Clients, associated project components can be added and/or removed. Undo & redo operations can be supported as a result of modifications to the existing Smart Client configuration. Instance modifications might be undoable events. Smart Clients can support Internationalization for user interface relevant components (dialogs, messages, help . . . ). Certain exemplary embodiments can extend the software interface to satisfy future desires. Compatibility to existing clients can be maintained.

Figure 13:
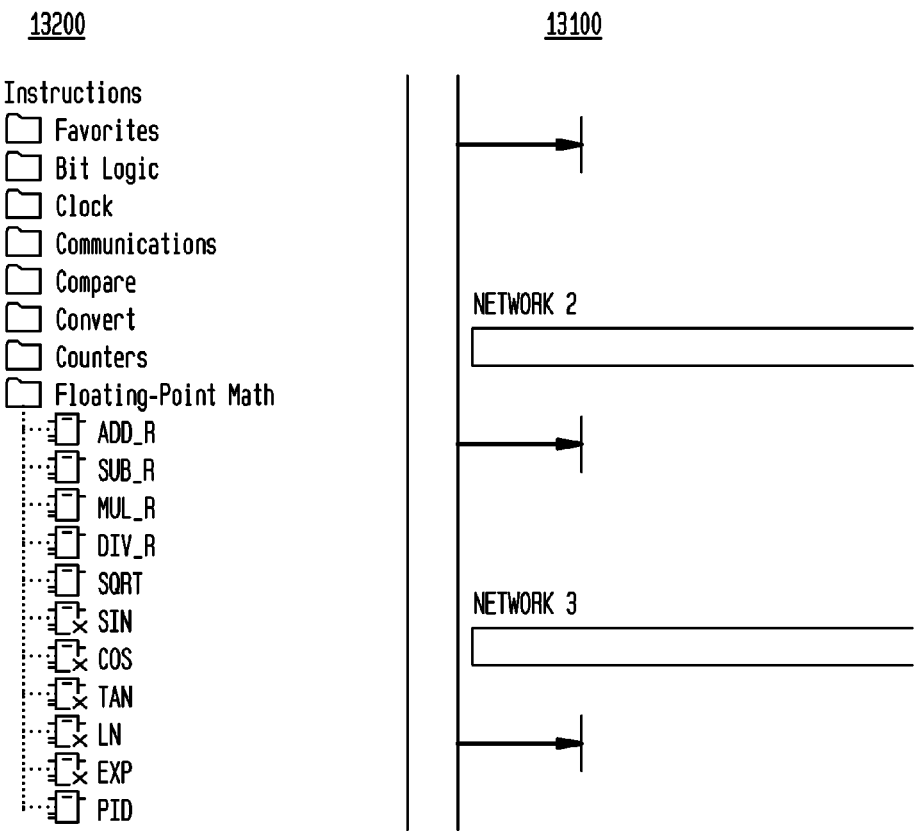
FIG. 13 is an exemplary user interface.

FIG. 13 is an exemplary user interface, which can comprise program editor 13100 with a task card comprising an editor's instruction tree 13200. An editor's task card can comprise supported objects. Instructions can be arranged and assorted regardless of how the instructions are implemented. Instructions implemented as inline MC7 instructions, FCs, FBs, SFCs, SFCs, and/or Smart Clients can appear as normal instructions. Smart Clients can be visually distinct. Such a distinction can be utilized to visually identify instructions, in both the tree and the editor that might utilize additional configuration performed through some type of special "Guided Configuration" approach.

Smart Clients can be comprised within the editor's task card during installation through the use of meta-data. Categorization within the instruction tree can also be specified through the meta-data. Certain exemplary embodiments can comprise a common, generalized method to add Smart Clients to multiple editors with a single description.

A Smart Client task card object can be instantiated during the creation of the task card. These Smart Client task card objects can comprise meta-data that describe the characteristics of the instruction. Certain exemplary embodiments might not utilize instructions added during run-time.

Language-related Smart Clients can provide the following information for an editor (or any other hosting business logic):

TABLE 2

| Item | Description |
| --- | --- |
| Type | Can identify the entry as a Smart Client |
| Subtype | Can identify the type of Smart Client (PID, HSC, Edge, . . . ) |
| Box type | Can identify the type of "box" (for language-related Smart Clients) |
| Assembly | Can identify the namespace of the assembly that will be responsible for Smart Client creation (i.e. the associated Smart Client factory). |
| Task Card Icon | Path to the instruction icon for representation within the folder of the task card |
| Instruction Icon | Path to the instruction icon to represent the instance within the editor |
| Instruction Icon Online | Path to the instruction icon for online representation within the editor (if any) |

Instantiation can occur when an action is performed that inserts a Smart Client into the respective editor area. A new Smart Client instance can be created.

However, the methodology used to create the new Smart Client instance can be abstracted from the editor. The editor might have no explicit knowledge or binding regarding the type of Smart Client. This knowledge might only be known by a class or subclass that has an association with the Smart Client.

This can be accomplished architecturally through the use of some type of creational factory pattern. Some variation of factory, abstract factory, or builder patterns might be sufficient.

Creational factory patterns can abstract the creation of objects to an interface or subclass that understands the class that might be created. Certain exemplary embodiments can permit the editor to call a single factory method that might be responsible for instantiating different types of Smart Clients.

Figure 14:
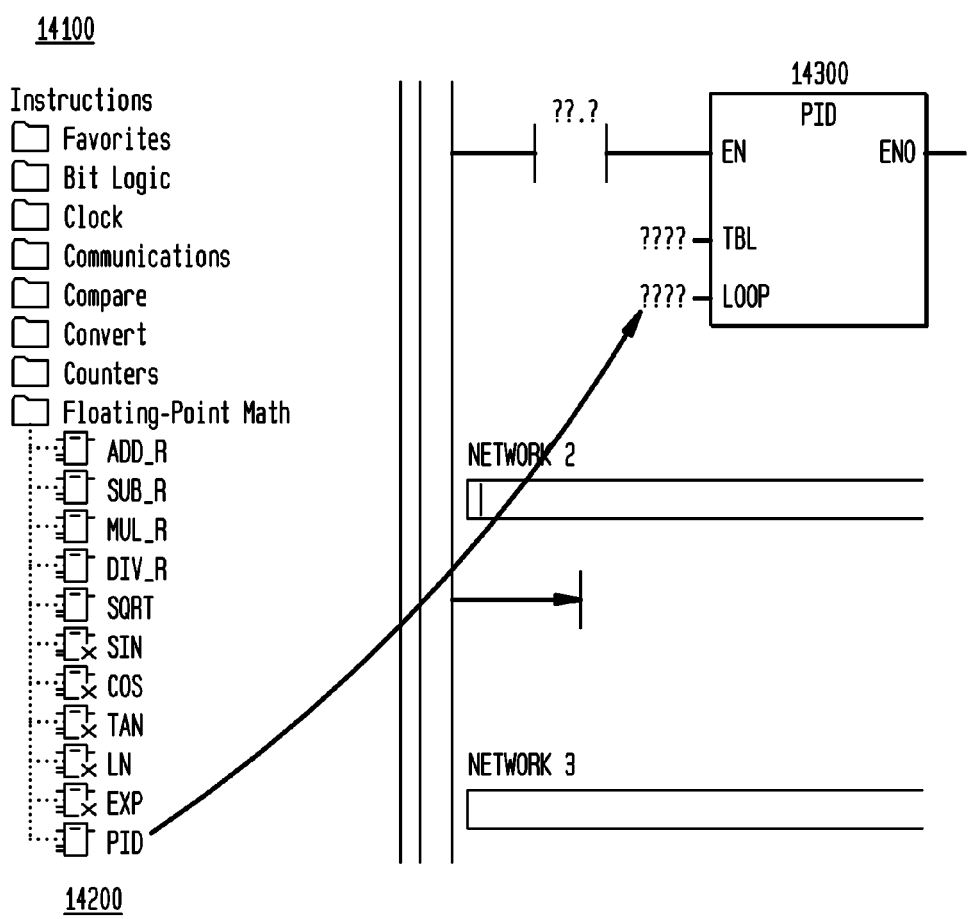
FIG. 14 is an exemplary user interface.

FIG. 14 is an exemplary user interface, which can comprise an instruction tree 14100. An icon, such as a PID icon 14200 can be dragged in a user interface by a user to an editor 14300, which can cause a generation of one or more user interfaces associated with configuring PID control.

Insertion of a Smart Client into an editor can occur in multiple ways. Once placed within the editor, the editor can create a "new" instance of the Smart Client using the supplied factory. Certain exemplary embodiments can call a factory supplied CreateInstance method. The factory supplied CreateInstance method can be adapted to call the CreateInstance method of the particular Smart Client to instantiate a new instance.

Instantiation of Smart Clients might be accomplished without the editor having any explicit knowledge of the Smart Client instance being created. Exemplary pseudo-code is illustrated below.

```
SmartClientFactory SCFactory = new SCFactory( );
...
//ISmartClient was previously declared as an interface
ISmartClient MySCInstance;
SCFactory.CreateInstance(MyDev, Type, SubType, MySCInstance);
```

The program editor can be associated with instantiated Smart Clients. However, the editor might have no real knowledge of the Smart Client's capabilities and behaviors. Whenever one of the actions referenced within the ISmartClient interface occurs, the editor can call the appropriate implementation provided by the given Smart Client. For example, if a customer hovers over the above instantiated Smart Client, the editor can call the following ToolTip method:

MySCInstance.ToolTip(Block2Call, ToolTipStream);

The system can be adapted to display the tool tip with a returned "ToolTipStream" stream. Smart Clients can be software additions that provide new functionality beyond the standard Platform environment. Certain exemplary participating editors (program and hardware configuration) use the displayed interfaces to provide control to the Smart Client implementations. Smart Clients can provide functionality associated with a task that they are designed to provide.

Certain exemplary Smart Clients can interact with the platform through standard external interfaces provided by the scripting object model. Standard functionality provided by the Platform or other Business Logic can be accessed by an external client through the scripting interfaces.

The changes initiated by Smart Clients using scripting can be automatically reflected within the editor's views by standard "On Change" notification mechanisms. These mechanisms can be provided by existing relationships between the Object Frame and the various editor's business logic.

Smart Client developers can be responsible to attempt to make new additions work properly and reliably with the platform. Certain exemplary Smart Clients can be extensions to standard products and can be relatively reliable.

Figure 15:
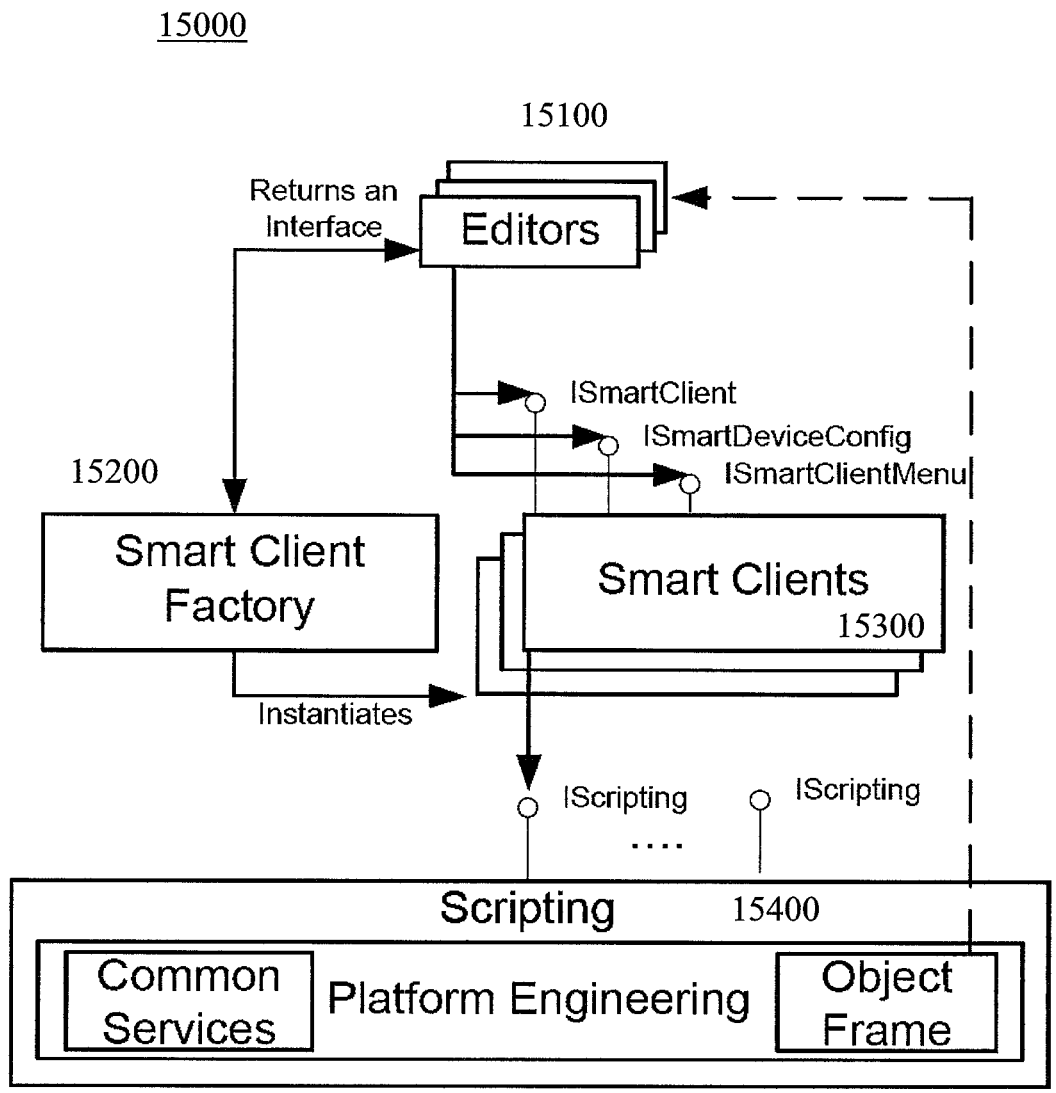
FIG. 15 is a block diagram of an exemplary system 15000.

FIG. 15 is a block diagram of an exemplary system 15000, which can comprise an illustrative flow related to application development. System 15000 can comprise one or more editors 15100, a smart client factory 15200, one or more smart clients 15300, and a scripting object 15400.

Certain exemplary Smart Clients can expose particular interfaces that hosting business logic (i.e. editors, hardware configuration) might use to initiate execution of functionality provided by the Smart Client.

An ISmartClient interface can be a controlling interface used by participating editors. Certain exemplary embodiments can be implemented by the Smart Client in order to provide functionality that is unique to respective Smart Clients.

The editor can call methods within this interface in order to invoke additional functionality provided by the Smart Clients. For example, to instantiate a new Smart Client object can invoke a "CreateInstance" method and to edit the configuration then can invoke an "EditInstance" method. Exemplary pseudocode follows:

```
Public interface ISmartClient
{
    int CreateInstance ( [in] IScriptObject IHomeBase,
        [in] int Type,
        [in] int SubType,
        [out] ISmartClient MyInstance );
    int EditInstance ( [in] IScriptObject IHomeBase );
    int EditType ( [in] IScriptObject IHomeBase );
    int VisualizeInstanceOffline ( [in] IScriptObject IHomeBase );
    int VisualizeInstanceOnline ( [in] IScriptObject IHomeBase );
    int RunWizard ( [in] IScriptObject IHomeBase );
    int CheckConsistency ( [in] IScriptObject IHomeBase );
    int Delete ( [in] IScriptObject IHomeBase );
    int Copy ( [in] IScriptObject IHomeBase );
    int Paste ( [in] IScriptObject IHomeBase );
    int Help ( [in] IScriptObject IHomeBase);
    int Print ( [in] IScriptObject IHomeBase,
        [in, out] Stream DataStream);
    int ToolTip ( [in] IScriptObject IHomeBase,
        [in, out] Stream DataStream);
}
```

Certain exemplary Smart Clients can be associated with program editors. These language-related Smart Clients can be adapted to perform operations consistent with existing language editors.

Certain exemplary Smart Clients can incorporate user interface behaviors adapted to support internationalization elements, which can comprise support for both language settings and regional options.

Certain exemplary Smart Clients can use a "Guided Configuration" approach. Opening an instance of a Smart Client can initiate a "Guided Configuration". The type and complexity of the configuration might vary depending upon the client.

Upon completion of client configuration, various components and/or values may be inserted into the program. These program components can represent the execution characteristics of a successfully configured Smart Client. These components can be any combination of object blocks (OBs), (instance data block) IDBs, function calls (FCs), function blocks (FBs), system function calls (SFCs), and/or system function blocks (SFBs), etc. Executable code can be comprised in separate, unique blocks or might be generated inline.

Certain components might also be shared. For example, one common first scan OB might be used by multiple language-related Smart Clients that utilize first scan initializations. Each respective Smart Client can add separate networks into the same first scan OB, which can permit minimal resource usage since only one first scan block is used for a plurality of Smart Clients.

The type and organization of these components might be the responsibility of the Smart Client designer. Certain exemplary embodiments can be available to the Smart Client designer.

The editor can inquire from the Smart Client whether it has been successfully configured. In certain exemplary embodiments, the Smart Client might know if the customer has completed certain exemplary configurations. Checking the consistency can also permit Smart Clients to perform certain verifications of proprietary components, which might be performed during a compilation or before a download.

In certain exemplary embodiments, language editors can comprise a means to edit the type of a call's instance by starting from the call's instance. Since Smart Clients in language editors are sometimes calls and might be implemented as such, in certain exemplary embodiments a callback can be provided for "Smart Clients". A Smart Client can provide a means to alter or modify a dialog procedure according to user's specification. The specific action to be performed by a particular Smart Client might be determined by the "Smart Client" designer.

The RunWizard call is a potential callback, which might not be provided by an editor. In certain exemplary embodiments, RunWizard can initiate the Smart Clients' contextless operation. The Workbench can be extended to provide a call embedded into an interface adapted for use by a user. Certain exemplary embodiments can comprise an extras menu "RunSmartClient", which can be adapted to show certain installed Smart Clients. Upon selection the selected Smart Client can be instantiated and receive a RunWizard callback.

A "Delete" operation can be adapted to delete an editor's instruction instance and/or related components. The delete method can be called when an instance of a Smart Client is deleted. The delete operation can occur in many different ways (e.g., delete instruction, delete rung, etc.). In certain exemplary embodiments, the delete call can be executed regardless of how the instruction was deleted.

Deletion of a Smart Client instance can cause a deletion of certain associated components. Any component shared by more than one Smart Client can be referenced counted and/or deleted when no other instance of the Smart Client is using the component. In certain exemplary embodiments, the Smart Client can delete components.

For blocks shared by more than one Smart Client, one option instead of using reference counting might be to examine the number of networks within the block. When the number reaches 0, the block might be deleted.

A copy operation can copy a core object and places the core object in a clipboard. This object type can be a standard object model type and can be managed during future paste operations.

In addition to the standard copy operation, the editor might invoke the Smart Client's copy operation, which can be adapted to augment the standard copy operation. The Smart Client might be adapted to comprise additional proprietary information into the clipboard which might be used during a subsequent paste operation.

The editor's Paste can insert the Smart Client previously copied into the clipboard at the current editor position. In addition to this standard paste operation, the editor can invoke the Smart Client's paste operation. The Smart Client can be adapted to read a part of information out of the clipboard and might perform one or more predetermined tasks, which might augment the standard paste operation. For example, the Smart Client might perform a reference count of the number of instances. This might be used to delete a Smart Client's project components when the reference count is reduced to zero.

Smart Clients can provide support for customized user assistance through the provision of custom help topics. A Smart Client's help provision might be a separate one, which might not be integrated into the editor's help. Upon this call a Smart Client can obtain the current internationalization setting, then display help information in this language (or fall back to a default language) and eventually return control back to the editor.

Smart Clients can be adapted to generate a formatted representation of their individual configuration that might be used for printing. The Smart Clients can provide formatted information to the program editor for printing.

Format of the configuration can be provided by the Smart Client designer. This format might vary depending upon each Smart Client. Certain exemplary embodiments can conform to standard printing usability styles. In certain exemplary embodiments editors first print their own information and then append any Smart Clients' additional print pages.

Smart Clients can be adapted to generate a custom, formatted tool tip. This tool tip can be used to display various pieces of information about the Smart Client. Information can comprise one or more of the following:
    the title of the instruction;
    an abbreviated helpful description of the instruction;
    the set of desired configuration parameters along with their values;
    a listing of the instruction prototypes IN, OUT, and IN/OUT parameters; and/or
    an optional user supplied comment. In certain exemplary embodiments, a predetermined number of characters can be displayed.

The tool tip might become visible whenever the cursor is hovering inside a complete box instruction. Certain exemplary embodiments might not provide a specific tool tip sensitive sub-areas within an instruction.

Internationalization support can be provided.

FIG. 16 is an exemplary user interface, which can indicate information related to a data transfer from a remote PLC to a device associated with a specified local address. The user interface can provide information, as illustrated, that can comprise identities of a port, a remote station, remote buffer, and/or local buffer, etc.

A Smart Client might show the current values of configured items. These values can be determined using data reads.

In online visualization a Smart Client can be adapted to plot current values. In order for online plotting or repeated value display to go on smoothly, an asynchronous data read capability might be adequate. If scripting cannot provide for online plotting or repeated value display, a poll read as laid out following can be utilized.

A read flagged as poll read can return immediately with an indication if data were available and hence might have been provided or not. If a read did not provide any data, the Smart Client might nap for a predetermined time span before repeating a read attempt. To avoid excessive system load factors, a nap of at least 50 Milliseconds might be conducted. Longer naps might be utilized.

A separate VisualizeInstanceOffline can be provided for a Smart Client, which can be adapted to comprise an instance value display and possible tuning for an offline side. Such tuned instance values can be stored in an offline database (DB) and can be subsequently downloaded.

In editors, there might be a user-addressable function "VisualizeInstance". If the editor is in an online mode at the time the user selects it, the Smart Client can be called via VisualizeInstanceOnline. If the editor is in offline mode, the Smart Client can be called via VisualizeInstanceOffline. Internationalization support can be provided for both functions.

An IScriptObject interface can be provided to access platform services exposed by a scripting object model. IScriptObject can be an interface for an abstracted "Object Frame" object. This interface can be cast to any specializations derived from an "Object Frame". These specializations might be defined in an object model of certain exemplary embodiments.

In certain exemplary embodiments, the Smart Client might understand the type of object(s) for an exemplary implementation. Upon activation of certain exemplary methods, each Smart Client can be adapted to cast and verify that a provided interface is compatible with an implementation. The following is an example of pseudocode for a Smart Client to perform a cast to a DeviceItem:
    DeviceItem device=(IHomeBase as DeviceItem);
    if (device==NULL)
        return false;

If the cast succeeds, the object can be used as desired. The method can be adapted to return if the cast is not successful. If a given SmartClient is a programmable object type, then the IHomeBase can be one of the following:
    for Smart Clients that are represented by a block, the IHomeBase will be that block; or
    for Smart Clients that are represented by other means, such as inline code, the IHomeBase will be the editor's target object.

For Smart Clients that represent hardware configuration objects, their IHomeBase can be one of the following:
    for Smart Clients that are represented by a DeviceItem, IHomeBase will be that DeviceItem; or
    for Smart Clients that are represented by other means, IHomeBase will be an appropriate DeviceItem (e.g. a rack).

Parameters using Stream data types can be declared using an input/output declaration type. Although some of the streams can be used as an output type, such can be declared as input/output types in order to permit memory allocations to be garbage collected.

In certain exemplary embodiments, Smart Clients can utilize standard Platform support for undo and redo. In certain exemplary embodiments, core objects can be utilized and Smart Clients might not utilize support beyond standard object frame types.

In certain exemplary embodiments, the Smart Client can be stateless. In certain exemplary embodiments, upon completion of a configuration activity, editors can update the Smart Client's internal object representation into the attributes of the objects. Certain exemplary embodiments can be adapted to provide support for "Common Services" comprised within the Platform.

In certain exemplary embodiments, Smart Clients can generate configurations that are represented by many different types of objects. Each object can be generated or modified in a single configuration session. Undo and redo operations can identify and manage certain objects within a single configuration session as a single undo and redo transaction.

In certain exemplary embodiments, the caller (editor or workbench) can enable an undo transaction before the Smart Client is actually called. Certain undoable operations performed by the Smart Client before control is returned to the caller can be recorded within such a single transaction. Once the Smart Client relinquishes control to the caller, the transaction can be closed. In this manner, all undoable actions can be recorded within an individual transaction.

An undo operation might not automatically display the view that originally was used to change the configuration. For example, assuming the editor's property area was used to perform the Smart Client configuration, if the property area is not visible, an undo operation might not cause the window to become visible. In this context, the customer might not be able to visually see what is actually being undone.

Smart Clients can be aware that certain mnemonics can be subject to internationalization. Certain exemplary embodiments can handle such mnemonics according to the platform's current mnemonic setting. In order for a Smart Client to be capable of doing this, the smart client can obtain and/or receive the platform's current mnemonic setting via Scripting. Standard cross-reference support can provide appropriate visibility for Smart Clients component and resource usage.

As previously stated, Smart Clients can comprise many different program components (e.g., OBs, FCs/FBs, IDBs, etc). Cross-reference component usage can make use of the "generated" marker in order to determine appropriate visibility to the customer. The call-structure might show top-level calls to blocks representing the Smart Client. Certain calls within the Smart Client might not be visible.

In certain exemplary embodiments, certain shareable system-built-in resource used by the Smart Client can be visible within cross-reference usage. This means that any resource that might result in shared access by the customer's program can be identified as being used by the Smart Client. In certain exemplary embodiments, the resource can be a high-speed counter. Certain exemplary embodiments can comprise six high-speed counters. Cross-reference can be adapted to identify a usage of these resources.

Certain program components can be compared between a source and destination. The source and destination can vary between offline projects contained on a disk and the online project being executed within the PLC. However, the Food & Drug Association (FDA) can provide one or more regulations regarding a comparison operation to determine that the application executing within the PLC is exactly the same application as stored in an offline state.

Consistent with the FDA regulations, Smart Client components and configurations can also be compared. The methodology used to perform these compares can be different depending upon decisions made within the architecture regarding visibility of generated components.

Certain exemplary embodiments can augment editor menus through the Smart Client. Certain exemplary Smart Clients can implement standardized interfaces that implement one or more public methods. An exemplary editor that supports Smart Clients can be adapted to interact with these interfaces. For menus, the editor can obtain this interface and provide certain context menu members for a predetermined Smart Client when receiving focus.

In certain exemplary embodiments, the interface in question can be a late binding interface. An early binding mechanism might be restricted to a prearranged set of interface members (e.g., methods, attributes, and/or iterator, etc.). An implementer might leave any of them out, but might not be able to add a method that has not been foreseen in the interface. Certain exemplary embodiments can add things that had not been made before. In certain exemplary embodiments, the Smart Client can be a unique new endeavor that may have novel specification.

The interface in question can be implemented by certain exemplary Smart Client and can be used (called) by an editor that uses a Smart Client. The interface can comprise two methods:
one to query a Smart Clients externally available functions; and/or
another one to invoke one of these functions.

The following pseudocode can be adapted to implement the interface.

```
Public interface ISmartClientMenu
{
// Called by an editor to get to know a Smart client's specific functionality
// (for instance to set up a context menu displaying these items)
    int GetAvailableVerbs ( [out] string [ ] AvailableVerbs);
// Called by an editor to invoke one of the Smart client specific
functionality
    int DoVerb ( [in] string VerbName, [in] DeviceItem Dev);
}
```

In certain exemplary embodiments, an editor can query such an interface and call an associated GetAvailableVerbs method when a Smart Client comes into focus. The Smart Client can be adapted to return a list of verbs informing about its externally available functionality. The editor can be adapted to call the following function (expressed as pseudocode):
string[ ] AvailableVerbsOfSmartClient=this.GetAvailableVerbs ( );

In certain exemplary embodiments, menu items can be shown as a context menu of the Smart Client instance, not in main menu. Upon a user's selection, the editor might call a DoVerb method to perform the selected action. The following pseudocode is an exemplary embodiment of the DoVerb method:

```
String VerbToPerform = "Configure";
if !( this.DoVerb (VerbToPerform, Device) )
// everything is alright
else
// raise exception
Public interface ISmartDeviceConfig
{
}
```

Such pseudocode describes what services might be provided by the methods and properties made available by the system (Engineering Platform and Domain Objects). In certain exemplary embodiments, Smart Clients can be adapted to interact with the system. In certain exemplary embodiments, Smart Clients can be enhanced by associated capabilities of an external model exposed by a scripting subsystem. In certain exemplary embodiments, capabilities such as get and set can be reflected in the scripting language directly as properties. For example, a get or set network might be implemented within the scripting language as follows:
Block[My_OB].CodeSection.Network[Network_Number]

The capabilities described below are not intended to represent all possible services. In certain exemplary embodiments, other services might be provided. In certain exemplary embodiments, Smart Clients can comprise one or more of functional attributes indicated in the following tables:

TABLE 3

Catalog

| Capability | Description |
|---|---|
| Get Catalog Entries | Can be used to obtain catalog information to determine specific module types. These can be used by Smart Clients to populate device items within the device item containers. Module identifications and descriptions can originate within the MDD or GSD device descriptions. Particular Smart Clients might obtain information from either the offline catalog or an actual instantiated hardware configuration. |

TABLE 4

Project

| Capability | Description |
|---|---|
| Get Device Item Container | Can be used to obtain a reference to an instantiated device container. |
| Get Project Name | Can be used to obtain the name of the existing project. |
| Get Project Path | Can be used to obtain the path of the existing project. |

TABLE 4-continued

Project

| Capability | Description |
|---|---|
| Get Creation Date/Time | Can be used to obtain the creation time and date of the existing project. |
| Get Available Resources | Can be used to obtain |

TABLE 5

Device Item Container

| Capability | Description |
|---|---|
| Get Device Iterator | Can be used to obtain the collection of certain devices existing within a hardware container, i.e. hardware configuration. |
| Get Device | Can be used to select a single device from the device collection. |
| Add Device | Can be used to add a new device. For example, adding a new device into hardware configuration, i.e. rack and slot. |
| Delete Device | Can be used to delete an existing device. |

TABLE 6

Device Item

| Capability | Description |
|---|---|
| Get Device Type | Can be used to determine the actual type of the device. |
| Get Device Limits | Can be used to determine the actual limits a device supports. For example, the number of high-speed counters, nesting levels, network ports, memory sizes, built-in I/O, data types, etc. |
| Get Device Properties | Can be used to read characteristics of a device such as name, manufacturer, MLFB, etc. |
| Get/Set Device Configuration | Can be used to get and/or set the complete device configuration. |
| Get Program Object Container | Can be used to obtain a reference to an instantiated program object container. |
| Get Program Object Folder Container | Can be used to obtain a reference to an instantiated program object folder container. |
| Get Program Object Iterator | Can be used to iterate across all program objects contained within a device. |
| Get Program Object Folder Iterator | Can be used to iterate across all folder objects contained within a device. |

TABLE 7

Device Configuration

| Capability | Description |
|---|---|
| Get/Set Parameter | Can be used to get and/or set individual device parameters. |
| Get Parameter Iterator | Can be used to iterate across all parameters of a device configuration. |

TABLE 8

Program Object Folder Container and Program Object Container

| Capability | Description |
|---|---|
| Get/Set Program Objects | Can be used to get (read) and/or set (add) program objects and/or folder objects. |
| Delete Program Objects | Can be used to delete program objects and/or folder objects. |
| Get Program Object Iterator | Can be used to iterate across all folders and objects. |
| Get Tag Iterator | Can be used to iterate across all tags. Refer to the "Tag" descriptions below for further operations. |

TABLE 9

Tags

| Capability | Description |
|---|---|
| Get/Set Attribute Properties | Can be used to get and set particular attribute properties. For example, name, address, data type, and comment. |

TABLE 10

Program Object

| Capability | Description |
|---|---|
| Get/Set Block Properties | Can be used to get and set particular block properties. For example, name, number, block type, OB type, author, know-how-protect/password, modification/creation time/date, language, etc. The OB type parameter can specify the behavior type of the OB. This might be cyclic, interrupt, first scan, and/or time delay, etc. Smart Clients can use specific instances of these OB types, which might be hidden from the customer. |
| Get/Set Interface | Can be used to get and set the contents of a program object's declaration interface. This operates on the complete interface. |
| Get/Set Code Section | Can be used to get and set the code contents of a program object, which operates on a complete code section. |
| Get Online Object | Can be used to get access to the online representation of the program object, which can permit other block related services to operate on an online representation instead of the ES representation. A set of online services that might be supported can comprise "Get Program Object" (DBs and FBs), "Get Interface Section", "Get Attribute", and Set Attribute". In order for online plotting or repeated value display to be performed smoothly, asynchronous data read capabilities can be available. If scripting cannot provide this, a polled read can be used. Such a poll read might return immediately and give an indication if data was available or not. |

TABLE 11

Interface Section

| Capability | Description |
|---|---|
| Get/Set Declaration Iterator | Can be used to iterate over the program object's declaration. |
| Get/Set Declaration | Can be used to obtain and set a particular interface declaration. |
| Delete Declaration | Can be used to delete an individual interface declaration. |

TABLE 12

Declaration

| Capability | Description |
|---|---|
| Get/Set Attribute Properties | Can be used to get and set particular attribute properties. For example, name, section type, data type, initial value, and/or comment, etc. |

TABLE 13

Code Section

| Capability | Description |
|---|---|
| Get/Set Network Iterator | Can be used to iterate over the code contents using the resolution of a network. Smart Clients can be adapted to use common, individual program objects across multiple different Smart Client instances. For example, one common first scan OB might be used by many different Smart Clients. Each Smart Client might incorporate additional code while not influencing certain existing code. |

TABLE 13-continued

Code Section

| Capability | Description |
|---|---|
| Get/Set Network | Can be used to get and set the source code contents using the resolution of a network. |
| Delete Network | Can be used to delete an individual network. |

TABLE 14

Common Services

| Capability | Description |
| --- | --- |
| Feedback Services | Can be used to acquire access to the various user interface controls supplied by the Platform |

TABLE 15

Internationalization

| Capability | Description |
| --- | --- |
| Get Current Mnemonic Setting | Can be used to determine the current mnemonic setting for the Platform. Can be used by Smart Clients to acquire mnemonic information according to the platform's current settings. |
| Get Current Language Setting | Can be used to determine the current language settings for the Platform. Can be used by Smart Clients to display information with the same language settings. |

Each instantiation of a Smart Client can result in an instance object created by the factory. As previously stated, the factory might provide an interface to access this instance object to the editor.

FIG. 17 is an exemplary set of user interfaces 17000, which can comprise an instruction tree user interface 17100, an editor icon 17300, and a data structure user interface 17400. In set of user interfaces 17000, the instance object can represents a particular Smart Client instance. The state information of a Smart Client can be made persistent. Certain exemplary embodiments can use existing editor objects and expand them in such a way that storage is provided.

For Smart Clients that are represented by a block, storage might be reserved in the block. For Smart Clients that are represented by other means, such as inline code, the storage might be reserved in the editor's target object. In certain exemplary embodiments, the editor can be adapted to distinguish between storage for multiple Smart Client instances (multiple expando attributes, each with a unique reference to the particular Smart Client instance).

In certain exemplary embodiments, a Smart Client can be visually represented by a call. The actual code can be generated as either an actual call or inline, once the general language pragma "inline" is available.

For Smart Clients that are represented by a block, the provided "IHomeBase" can be this block. For Smart Clients that are represented by other means, the provided "IHomeBase" might be the editor's target block. The "Smart Client" can be adapted to use "IHomeBase" to navigate through the object model to acquire appropriate objects. In certain exemplary embodiments, "IHomeBase" can be used to find the block container to create new blocks.

In certain exemplary embodiments, once the editor's target block is used, a correlation can occur between each Smart Client instance stored within the block.

A Smart Client's instance object can comprise specific configuration data that is not stored in other locations (e.g., instance DBs). For example, a "configuration complete" flag can be utilized, which can indicate whether the Smart Client has been successfully configured. A successful configuration can be detected and/or determined during program compilation. Typed OBs can permit multiple instances of the same OB type, such as cyclic, timed interrupt, and/or first scan, etc.

Smart Clients can use their own specific instances of typed OBs. The typed OBs can be independent and distinct from the typed OBs specifically inserted into a project by a customer. The Smart Client OBs can be marked as "generated" and can therefore be filtered from being visible to the customer. Certain exemplary embodiments can support typed OBs.

An editor can be adapted to flag the particular expando attribute holding the Smart Client internal object as a "component to be downloaded", which can result in these parts of the objects (blocks) being downloaded and uploaded just as the code section. After an upload, internal objects can appear just as before download and thus can be available for further operation.

Other information specified by the configuration sequence can be stored as parts of other objects (for instance actual values in DBs). These parts can be downloaded and/or uploaded along with objects and hence are also available. Certain exemplary embodiments can be adapted to support not only upload, but also import and export of Smart Client data.

In certain exemplary embodiments, project components specifically created by Smart Clients can be hidden from the customer's view. Certain exemplary customers might wish to regard Smart Clients as black boxes. Such customers might not understand additional components being made visible within a project. As a result, the customer might not desire to manage these components. In certain exemplary embodiments, generated components can remain in the customer's project.

Making components invisible can have architectural implications. Operations such as compare, delete, and copy might involve the Smart Client. The Smart Client, for example, might know what components should be deleted and when they should be deleted. Also, the Smart client might know what components might be compared to determine equality.

Additionally, these operations can be performed by the Smart Client regardless of where the operation was initiated. In certain exemplary embodiments, the Smart Client might be adapted to perform such operations whether the operation was initiated by an action within the language editor or from the Project Navigator. The Smart Client can be informed of such a request so the operation can be performed.

If certain architectural changes cannot be provided, another solution can be provided, which might comprise making the project components visible within the project navigator via a special filter, which might be based upon a special "generated" flag. Each component generated by the Smart Client might include the "generated" flag as a property.

The Project Navigator might use this "generated" flag to organize or filter these components in a different way. For example, an additional system generated folder(s) might be added to a tree and certain "generated" components be contained within folder(s). Certain exemplary embodiments can help minimize the impact to the customer, whilst fulfilling FDA requirements.

Making elements visible can permit the customer to perform basic project operations such as comparing or viewing properties (such as, according to FDA regulations). Manual deletion of such components might be permitted so customers can manage potential cluttering.

A language editor that supports Smart Clients can be extended to support additional capabilities. The language editor can be adapted to recognize when Smart Clients are dealt with rather than regular instructions. When an editor receives a command for a Smart Client, the editor can surrender execution to the Smart Client. Commands supported by a Smart Client can be defined by interface specifications.

In certain exemplary embodiments, language editors can support language-related Smart Clients through the use of blocks. In certain exemplary embodiments, macro (inline code) capabilities can be supported. For example, a user's view can appear as a block, but can be implemented as a macro.

Several capabilities might be realized when utilizing block functionality, which can comprise:
- operand tooltips;
- operand online status;
- power flow connectors (EN/ENO);
- default and dynamic prototypes as described below; and/or
- textual language integration; etc.

Certain exemplary language-related Smart Clients can have a default prototype (the number of inputs and outputs along with their data types), which can be used upon instantiation. Such Smart Clients can be adapted to change the default prototype depending upon a configuration selected by the customer. The number of inputs or outputs or the associated data types might change from the defaults, which might involve programmatically changing prototypes of existing instructions. In certain exemplary embodiments, updating cab maintain an existing operand configuration of an existing call.

The following functionality for Smart Client Customization can be implemented as general functionality:
- specific icons for calls rather than the standard call icon can be used in ladder instances;
- a flag for defining that the component can be "generated" by a Smart Client;
- a flag that can associate a Smart Client assembly with a normal block call, which can allows the platform to start a Smart Client rather than a typical editor when the user performs an action on a block (visual instance offline and online); and/or
- generate inline code rather than submit a call through the use of the inline "pragma" directive; etc.

In certain exemplary embodiments, discussions within each of interfaces and methods of these interfaces can comprise implications regarding interactions with scripting interfaces.

In certain exemplary embodiments, Smart Clients can be associated with program editors. As a result, the following example will focus upon a particular type of Smart Client using a PID instruction as an example.

The developer(s) of Smart Clients can define the various inheritance and aggregation models associated with these instructions. Although the various inheritance and aggregation models might not be part of the SPH-considerations, an example is provided below for further clarification.

TABLE 16

| Class/Variable Name | Type | Description |
| --- | --- | --- |
| ISmartClient | Interface | The Smart Client Interface definition. This interface can be defined and provided to all Smart Client developers. |
| SmartClientBase | Object | The Smart Client base is a base class that can comprise common behaviors for other Smart Clients. This base class can be defined and provided to other Smart Client developers. |
| SmartClientBase.Container | Collection | Container of all Smart Client objects, which can be utilized by other ES controls that might iterate over the objects. Examples could be task card visualizations or previewing of Smart Clients for printing. |
| PIDBase | SmartClientBase | The PID Base is a base class that can comprise common behaviors for certain PID Smart Clients. For example, the PID Base can be used to support common behaviors across different types of PID instructions. |
| PIDBase.Icon | Icon | The icon for a PID instruction. |
| PIDBase.Container | Collection | Container of certain PID objects. This container can be used by the PID Control Panel to iterate over all PID instances. |
| PIDController | PIDBase | The individual PID object. |
| PIDController.Name | String | The visible name of the PID instruction instance. |
| PIDController.Properties | Collection | The properties of each PID instruction instance. |
| PIDController.Blocks | Collection | The blocks associated with each PID instruction instance. |

The "ISmartClient" interface can define a set of behaviors that can be implemented by a Smart Client object. In addition to the "ISmartClient" interface, a "SmartClientBase" class can be made available. This base class can derive from the "ISmartClient" interface and provide basic behaviors for the required interface. Providing both an interface and base class can allow a client to inherit from either definition depending upon which provides the most value for a particular client.

Some particular types of Smart Clients might optionally provide their own base behaviors. For example, different types of PID instructions can be adapted to provide standard PID behaviors within a common base. Such a PID base can comprise a container for PID instructions, which might provide a way for other PID related objects, such as the PID Tuning Control Panel, to list or iterate through the different PID instances.

Figure 18:
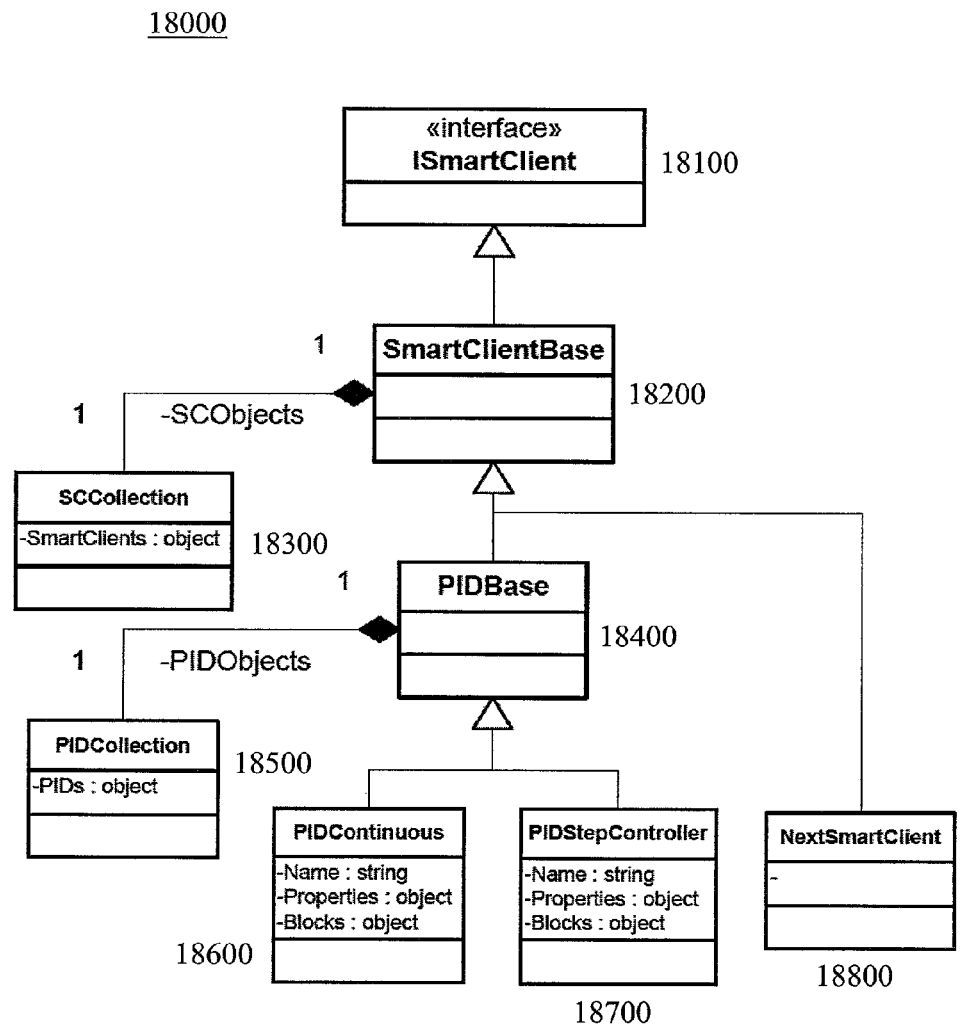
FIG. 18 is a block diagram of an exemplary system 18000.

FIG. 18 is a block diagram of an exemplary system 18000, which can comprise an Ismartclient object 18100, a Smartclientbase object 18200, a SCCollection object 18300, a PIDBase object 18400, a PHDCollection object 18500, a PID- Continuous object 18600, a PIDStepController object 18700, and a NextSmartClient object 18800

Certain exemplary embodiments provide an interface "ISmartClient" that can be inherited by certain Smart Clients. Each Smart Client can be adapted to provide a specific implementation for its own behavior as mentioned above. Implementing pseudocode can be as follows:

```
public class ContinuousPID : PIDBase or
public class ContinuousPID : SmartClientBase or
public class ContinuousPID : ISmartClient
{
    // implementation of a Smart Client can go here
    int CreateInstance (IScriptObject IHomeBase, ... ) {...}
    int EditInstance (IScriptObject IHomeBase) {...}
    int Tooltip (IScriptObject IHomeBase) {...}
    ...
}
```

In certain exemplary embodiments, some types of Smart Clients might have additional base classes that provide standard behaviors for the given type. In certain exemplary embodiments, Smart Clients might conform to standard specifications associated with a Platform usability model. Such specifications can be defined within the Platform usability model.

In certain exemplary embodiments, standard platform controls can be used for user interfaces. In certain exemplary embodiments, standard platform controls might not be exposed through a scripting interface. In certain exemplary embodiments, standard platform controls can be accessed via a duplicate of common services assemblies dedicated to external use. In certain exemplary embodiments, standard platform controls of the Platform's common service interface can be exposed to certain participating Smart Clients.

Any Smart Client can conform to standard Platform internationalization specifications. Any textual user interface item can be displayed within property pages, error messages, tool tips, help, icons, etc, must conform to these standard requirements. A Smart Client can interrogate current internationalization settings via Scripting to fulfill this requirement.

In certain exemplary embodiments, access to the Project Navigator might not be provided from Smart Clients. In certain exemplary embodiments, actions performed by Smart Clients can be accomplished via interfaces provided by the scripting subsystem. For such embodiments, potential compatibility issues and concerns might be comprehended by the scripting interfaces.

In certain exemplary embodiments, Smart Clients might not be affected by future revisions of the Platform. New versions of the platform might not invoke software changes to existing Smart Clients.

In certain exemplary embodiments, Smart Clients can use common service interfaces. The scripting subsystem can be adapted to determine if such service interfaces are exposed via the scripting interface or are accessed directly.

In certain exemplary embodiments, common platform actions performed by Smart Clients can be accomplished through a duplicate of the common service interface dedicated to external use. To ensure that Smart Clients have a consistent appearance and behavior, certain exemplary embodiments can use external platform common services. Common services can comprise customer feedback services such as error message displays, error message reporting, and/or message boxes, etc.

In certain exemplary embodiments, each individual Smart Client can establish levels of compatibility for succeeding Smart Client versions. In certain exemplary embodiments, Smart Clients can provide a similar level of compatibility as the Platform. For example, a particular version of a Smart Client might be able to understand previous versions.

In certain exemplary embodiments, individual project components (e.g., OBs, DBs, FBs, and/or FCs, etc.) might become visible to the customer. Such decisions might be made individually during the development of each Smart Client. In certain exemplary embodiments, Smart Clients can be deployed within additional packages such as "Hardware Support Packages" or "Optional Packages". Each additional package can be individually installed upon a given programmable logic controller (PLC). In certain exemplary embodiments, a particular Smart Client might be saved to a project with the project being provided to a different PLC that does not have the same additional packages installed.

In certain exemplary embodiments, customers can acquire and install additional packages to be able to operate Smart Clients. In certain exemplary embodiments, Smart Clients can be downloaded to the PLC and/or executed. In certain exemplary embodiments, further edits to Smart Client configurations might not be supported until the additional packages are installed.

In certain exemplary embodiments, Smart Clients might not have compatibility specifications with existing legacy applications. In situations where existing legacy projects are opened, conversions might not be performed from a legacy application to the new Smart Client representations. For example, if the application originally developed in the classic world includes application code for a high-speed counter, the high-speed counter might not be converted into a corresponding Smart Client representing the high-speed counter.

Figure 19:
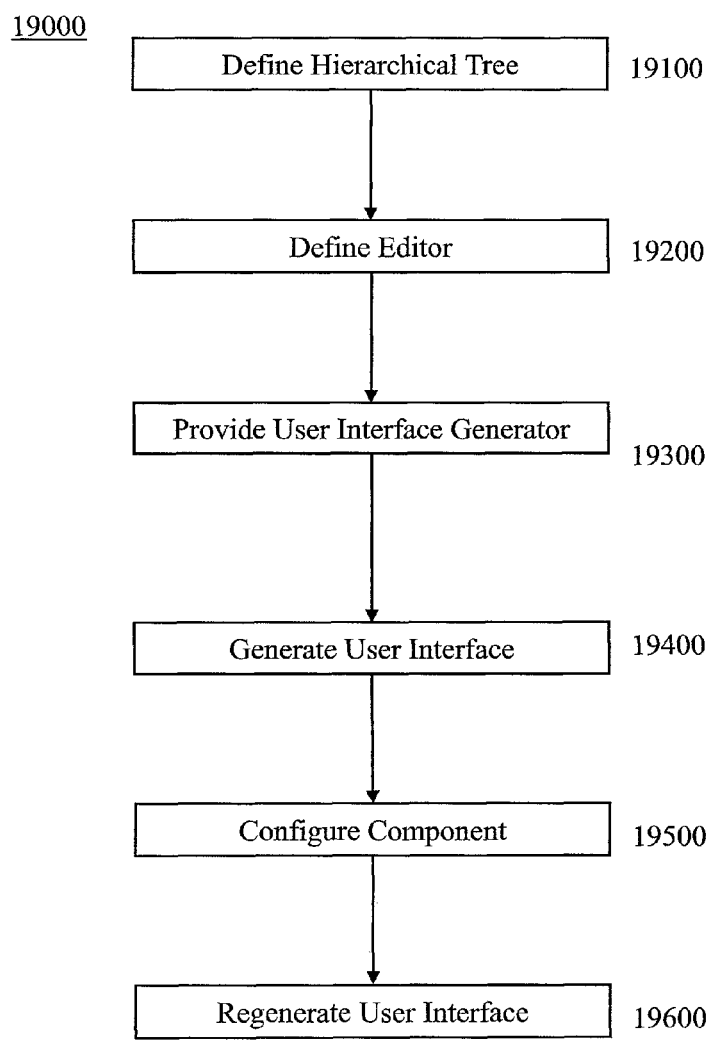
FIG. 19 is a flowchart of an exemplary embodiment of a method 19000.

FIG. 19 is a flowchart of an exemplary embodiment of a method 19000. Each activity of method 19000 can be implemented manually and/or automatically. Each activity of method 19000 can be encoded and/or embodied in machine executable instructions stored on a machine-readable medium. The machine instructions can be adapted to perform any activity or subset of activities of method 19000. At activity 19100, a hierarchical tree can be defined. The hierarchical tree can be a logical tree that comprises branches and/or leaves. Each branch and/or leaf of the hierarchical tree can represent an available subset of machine instructions that can be adapted to configure a PLC system component and/or automatically generate other machine instructions, such as a PLC control program.

At activity 19200, an editor can be defined. The editor can be adapted to configure one or more applications associated with the PLC control program. The editor can be adapted to receive instructions in a programming language specified in IEC 61131-3.

At activity 19300, a user interface renderer can be provided, which can be adapted to automatically cause a plurality of distinct user interfaces to be rendered. Each user interface from the plurality of distinct user interfaces can be adapted to configure a corresponding software application from a plurality of software applications associated with operating a programmable logic controller (PLC). For a selected software application from the plurality of software applications, the user interface renderer can be adapted to automatically provide a first user interface if the PLC is executing a control program and a second user interface if the PLC is not executing the control program.

At activity 19400, a user interface can be rendered. For example, the first user interface can be adapted to facilitate debugging the selected software application. The first user interface can be adapted to receive a debugging input from a user. The second user interface can be adapted to provide a current set of configuration parameters associated with the selected software application. The second user interface adapted to receive a configuration input from the user, and responsive to the configuration input, the second user interface can be adapted to change one or more configuration parameters from the current set of configuration parameters.

At activity 19500, a device and/or application can be configured. The device and/or application can be automatically configured based upon the configuration input. In certain exemplary embodiments, responsive to the configuration input by the user, the application can be automatically generated and can be used as a portion of a control program of the PLC.

At activity 19600, the user interface can be regenerated. The regenerated user interface can have context information and/or values comprised therein from the configuration input and can thereby be distinct and/or different that previously generated versions of the user interface.

Figure 20:
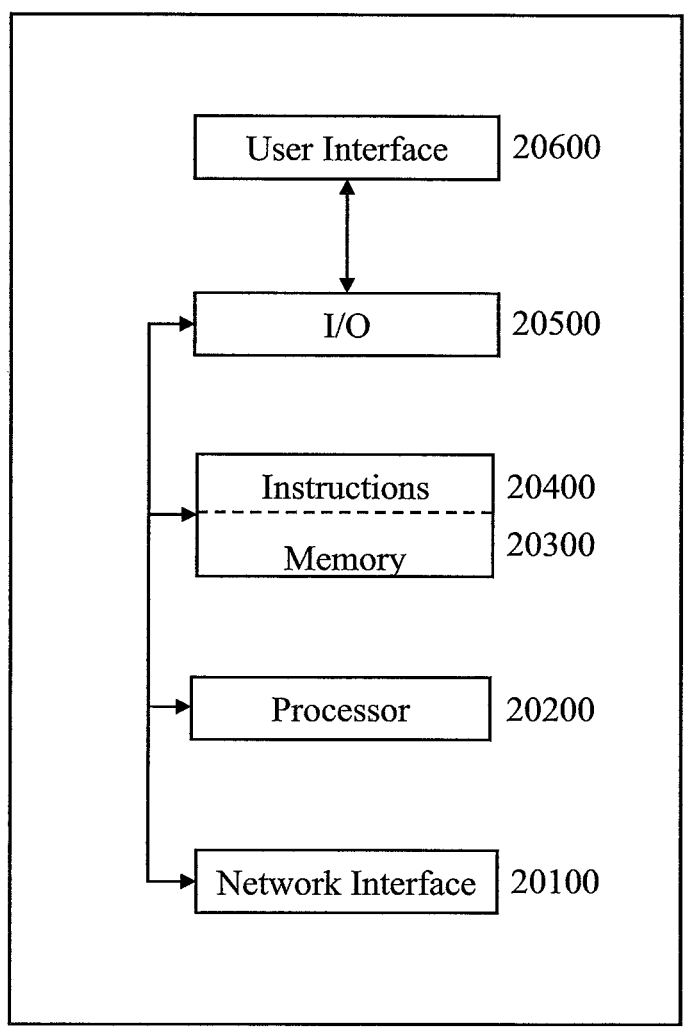
FIG. 20 is a block diagram of an exemplary embodiment of an information device 20000.

FIG. 20 is a block diagram of an exemplary embodiment of an information device 20000, which in certain operative embodiments can comprise, for example, information device 1540 of FIG. 1. Information device 20000 can comprise any of numerous components, such as for example, one or more network interfaces 20100, one or more processors 20200, one or more memories 20300 containing instructions 20400, one or more input/output (I/O) devices 20500, and/or one or more user interfaces 20600 coupled to I/O device 20500, etc.

In certain exemplary embodiments, via one or more user interfaces 20600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
ability—a quality of being able to perform.
accept—to receive.
access—(n) a permission, liberty, right, mechanism, or ability to enter, approach, communicate with and/or through, make use of, and/or pass to and/or from a place, thing, and/or person. (v) to enter, approach, communicate with and/or through, make use of, and/or pass to and/or from.
according—agreeing with.
activity—an action, act, deed, function, step, and/or process and/or a portion thereof.
actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).
adapted to—suitable, fit, and/or capable of performing a specified function.
and/or—either in conjunction with or in alternative to.
another—an additional one.
apparatus—an appliance or device for a particular purpose.
application—the act of putting something to a use and/or purpose; and/or a set of computer-readable instructions and/or a computer program.
associated with—related to.
at least—not less than.
automatic—performed via an information device in a manner essentially independent of influence and/or control by a user.
automatically—acting and/or operating in a manner essentially independent of external human influence and/or control. For example, an automatic light switch can turn on upon "seeing" a person in its view, without the person manually operating the light switch.
available—present and/or ready for use.
between—in a separating interval and/or intermediate to.
can—is capable of, in at least some embodiments.
cause—to bring about, provoke, precipitate, produce, elicit, be the reason for, result in, and/or effect.
change—(v.) to cause to be different; (n.) the act, process, and/or result of altering or modifying.
circuit—an electrically conductive pathway comprising one or more operative electrical devices.
command—a signal that initiates an operation defined by an instruction.
communicate—to exchange information.
communication—a transmission and/or exchange of information.
comparison—an act of examining resemblances and/or differences.
component—a constituent element and/or part.
comprise—to include but not be limited to.
comprised by—included by.
configuration—a physical, logical, and/or logistical arrangement of elements.
configuration parameter—a value that is adapted for use in communicatively coupling, scaling, filtering, sampling, interpreting, formatting, monitoring, and/or controlling a component of a PLC system, a sensor, and/or an actuator; and/or data related thereto.
configure—to design, arrange, set up, shape, and/or make suitable and/or fit for a specific purpose.
control program—a set of machine instructions executed by a programmable logic controller and adapted to read inputs from one or more sensors and control one or more actuators.
corresponding—related, associated, accompanying, similar in purpose and/or position, conforming in every respect, and/or equivalent and/or agreeing in amount, quantity, magnitude, quality, and/or degree.
count—(n.) a number reached by counting and/or a defined quantity; (v.) to increment, typically by one and beginning at zero.
couple—to join, connect, and/or link two things together.
current—contemporaneous to the present time.
data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include array, dictionary, graph, hash, heap, linked list, matrix, object, queue, ring, stack, tree, and/or vector.

deadline—a time interval during which an activity's completion has more utility to a system, and after which the activity's completion has less utility. Such a time interval might be constrained only by an upper-bound, or it might be constrained by both upper and lower bounds.

debug—to detect and remove errors from machine instructions.

default—an option that is selected automatically unless an alternative is specified.

delay—an elapsed time between two states and/or events.

detection—an act of sensing or perceiving.

determine—to find out or come to a decision about by investigation, reasoning, or calculation.

device—a machine, manufacture, and/or collection thereof.

difference—a point of unlikeness and/or dissimilarity.

distinct—discrete and/or readily distinguishable from all others.

download—to transfer data from a memory device.

each—every one of a group considered individually.

editor—hardware, firmware, or software adapted to provide a user interface adapted to rearrange and/or modify machine instructions.

execute—to carry out a computer program and/or one or more instructions.

exist—to have actual being.

expansion module—an Input/Output module, in a housing distinct from a housing of a programmable logic controller (PLC), that is adapted to be communicatively coupled to the PLC.

fail—to be unsuccessful.

first—an initial element of a series.

Food and Drug Administration—a regulatory agency of the federal government of the United States.

for—with a purpose of.

format—an arrangement of data for storage and/or display.

from—used to indicate a source.

further—in addition.

generate—to create, produce, render, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

hierarchical—organized, segregated, and/or classified according to various criteria into successive levels and/or layers.

high speed—at a rate at least as fast as every 5 microseconds.

icon—in a graphical user interface (GUI), a pictorial, on-screen representation of an object, such as a file, program, folder, or disk drive.

if—in case that.

indicative—serving to indicate.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initially—at a beginning.

input—a signal, data, and/or information provided to a processor, device, and/or system.

input/output (I/O) device—an input/output (I/O) device of an information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

Input/Output module—a device and/or system adapted to receive and/or forward information between a programmable logic controller (PLC) and a predetermined set of sensors and/or actuators.

instruction tree—a hierarchically-organized set of machine instructions.

language editor—a rendering adapted to receive programming code according to a programming language specified in IEC 61131-3, namely, FBD (Function Block Diagram), LD (Ladder Diagram), ST (Structured Text, Pascal type language), IL (Instruction List) and/or SFC (Sequential Function Chart).

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable—of a form from which an information device can obtain data and/or information.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

made—produced.

may—is allowed and/or permitted to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

meta-data—information about data.

method—a process, procedure, and/or collection of related activities for accomplishing something.

modify—to change, cause to change, edit, alter, replace, delete, and/or correct.

module—a device adapted to be communicatively coupled to a predetermined set of information devices, input/output devices, sensors, and/or actuators.

more—additional.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

non-PLC—a device other than a programmable logic controller.

not—a negation of something.

obtain—to receive, get, take possession of, procure, acquire, calculate, determine, and/or compute.

one—a single unit.

organized—to order and/or arrange.

output—(n) something produced and/or generated; data produced by an information device executing machine-readable instructions; and/or the energy, power, work, signal, and/or information produced by a system; (v) to provide, produce, manufacture, and/or generate.

packet—a generic term for a bundle of data organized in a specific way for transmission, such as within and/or across a network, such as a digital packet-switching network, and comprising the data to be transmitted and certain control information, such as a destination address.

place—to put in a particular place or position.

placement—an act of placing.

plurality—the state of being plural and/or more than one.

predetermined—established in advance.

prior—earlier in time.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

procedure—a set of machine-readable instructions adapted to perform a specific task.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, ignitors, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

proportional/integral/derivative—a control loop feedback algorithm that attempts to correct the error between a measured process variable and a desired setpoint by calculating and then oututting a corrective action that can adjust the process accordingly. The algorithm involves three separate calculations; a proportional calculation determines a reaction based on a current error, an integral calculation determines a reaction based on a sum of recent errors, and a derivative calculation determines a reaction based on a rate at which the error has been changing. A weighted sum of the proportional, integral, and derivative calculations is outputted to a control element, such as the position of a control valve and/or power into a heating element.

provide—to furnish, supply, give, convey, send, and/or make available.

range—a measure of an extent of a set of values and/or an amount and/or extent of variation.

real-time—a system (or sub-system) characterized by time constraints on individual activities and scheduling criteria for using those time constraints to achieve acceptable system timeliness with acceptable predictability.

receipt—an act of receiving.

receive—to gather, take, acquire, obtain, accept, get, and/or have bestowed upon.

referenced—the state of being related or referred.

regarding—pertaining to.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

report—a presentation of information in a predetermined format.

representation—an approximation, equivalent, mathematical characterization, rendering, image, and/or likeness of something.

request—(v.) to express a need and/or desire for; to inquire and/or ask for. (n.) that which communicates an expression of desire and/or that which is asked for.

requirement—a demand.

respond—to reply.

response—a reply and/or answer.

right—authority granted to perform one or more activities.

responsive—reacting to an influence and/or impetus.

said—when used in a system or device claim, an article indicating a subsequent claim term that has been previously introduced.

second—an element that immediately follows an initial element of a series.

selected—a chosen item.

send—to convey, dispatch, and/or transmit.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

set—(n). related plurality of predetermined elements; and/or one or more distinct items and/or entities having a specific common property or properties. (v) to establish a value.

signal—information, such as machine instructions for activities, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real-time, continuously generated, continuously varying, analog, discretely generated, discretely varying, quantized, digital, continuously measured, and/or discretely measured, etc.

soft deadline—the general case where completing the activity by the deadline results in the system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with the anti-lock braking system where a slow down in response would likely cause system failure, possibly even catastrophic failure.

software—instructions executable on a machine and/or processor to create a specific physical configuration of digital gates and machine subsystems for processing signals.

software generator—machine instructions adapted to create PLC application software responsive to information obtained via a rendered user interface.

specify—to describe, characterize, indicate, and/or state explicitly and/or in detail.

store—to place in a memory device.

structure—that which is complexly constructed, such as a building and/or an addition to a building; a hierarchy and/or placement of objects in a document; and/or a manner in which components are organized and/or form a whole.

subsequent—following in time.

substantially—to a considerable, large, and/or great, but not necessarily whole and/or entire, extent and/or degree.

system—a collection of mechanisms, devices, data, and/or instructions, the collection designed to perform one or more specific functions.

transmit—to provide, furnish, supply, send as a signal, and/or to convey (e.g., force, energy, and/or information) from one place and/or thing to another.

unsupported—not maintained and/or defined.

until—up to a time when.

used—employed in accomplishing something.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

user interface renderer—a processor and/or machine instructions adapted to cause a user interface to be rendered.

utilize—to use and/or put into service.

value—a measured, assigned, determined, and/or calculated quantity or quality for a variable and/or parameter.

via—by way of and/or utilizing.

version—one of a sequence of copies of a set of machine instructions, each of the sequence of copies changed via one or more modifications to the set of machine instructions.

when—at a time.

wherein—in regard to which; and; and/or in addition to.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A system comprising:
    a programmable logic controller including a user interface renderer;
    wherein said user interface renderer is adapted to cause a plurality of distinct user interfaces to be rendered, each user interface from said plurality of distinct user interfaces adapted to configure a corresponding software application from a plurality of software applications associated with operating a programmable logic controller (PLC), for a selected software application from said plurality of software applications, said user interface renderer adapted to automatically select and provide a first user interface if said PLC is executing a control program, wherein said control program is a set of machine instructions adapted to read inputs from one or more sensors and control one or more actuators, and a second user interface if said PLC is not executing said control program, said first user interface adapted to facilitate debugging said selected software application, said first user interface adapted to receive a debugging input from a user, said second user interface adapted to provide a current set of configuration parameters associated with said selected software application, said second user interface adapted to receive a configuration input from said user, and responsive to said configuration input, said second user interface adapted to change one or more configuration parameters from said current set of configuration parameters;
    wherein at least one of said plurality of distinct user interfaces is adapted to cause an automatic generation of a high-speed control procedure, said high-speed control procedure adapted to be executed by said PLC; and
    a software generator adapted to automatically generate a set of computer readable instructions for the PLC to control electrical inputs and outputs of the PLC responsive to information provided via at least one of said plurality of user interfaces.

2. The system of claim 1, further comprising:
    an input/output module, said input/output module adapted to be configured via one of said plurality of distinct user interfaces.

3. The system of claim 1, wherein said user interface renderer is adapted to render each of said plurality of user interfaces responsive to meta-data obtained from a hierarchical representation of said plurality of software applications.

4. The system of claim 1, wherein said user interface renderer is adapted to be modified to add at least one user interface to said plurality of user interfaces without changing a control program of said PLC.

5. The system of claim 1, wherein said selected software application is selected based upon a specified configuration.

6. The system of claim 1, wherein said user interface renderer does not use a PLC language editor to configure said selected software application.

7. The system of claim 1, wherein said selected software application is adapted to be referenced via an automatically rendered hierarchically-organized instruction tree, said instruction tree indicative of an organized structure associated with available PLC machine instructions.

8. The system of claim 1, wherein said user interface renderer is adapted to change at least one of said plurality of distinct user interfaces responsive to an automatic detection of access rights associated with said user.

9. The system of claim 1, wherein at least one of said plurality of distinct user interfaces is adapted to cause an automatic comparison of at least one value of said configuration input to a predetermined value.

10. The system of claim 1, wherein at least one of said plurality of distinct user interfaces is adapted to cause an automatic comparison of at least one value of said configuration input to a predetermined range of values.

11. The system of claim 1, wherein said user interface renderer initially renders said second user interface responsive to a placement of an icon of a hierarchically-organized instruction tree in an editor.

12. The system of claim 1, wherein said user interface renderer initially renders said second user interface responsive to a placement of an icon of a hierarchically-organized instruction tree in an editor, said user interface renderer adapted to provide a subsequent rendering of said second user interface comprising values modified via said configuration input.

13. The system of claim 1, wherein at least one of said plurality of distinct user interfaces is adapted to cause an automatic generation of a proportional/integral/derivative (PID) control procedure, said proportional/integral/derivative (PID) control procedure adapted to be executed by said PLC.

14. The system of claim 1, wherein at least one of said plurality of distinct user interfaces is adapted to cause an automatic generation of a high-speed counting procedure, said high-speed counting procedure adapted to be executed by said PLC.

15. The system of claim 1, wherein at least one of said plurality of distinct user interfaces is adapted to cause an automatic configuration of one or more non-PLC devices communicatively coupled to said PLC.

16. The system of claim 1, wherein at least one of said plurality of distinct user interfaces is adapted to cause an automatic configuration of a communication module communicatively coupled to said PLC.

17. The system of claim 1, wherein at least one of said plurality of distinct user interfaces is adapted to cause an automatic generation of a report indicative of automatically determined differences between a first version of said control program and a second version of said control program of said PLC.

18. A system comprising:
a circuit of a PLC (programmable logic controller) to automatically cause a plurality of distinct user interfaces to be rendered, each user interface from said plurality of distinct user interfaces adapted to configure a corresponding software application from a plurality of software applications associated with operating a PLC, for a selected software application from said plurality of software applications, said circuit adapted to automatically select and provide a first user interface if said PLC is executing a control program, wherein said control program is a set of machine instructions adapted to read inputs from one or more sensors and control one or more actuators, and a second user interface if said PLC is not executing said control program, said first user interface adapted to facilitate debugging said selected software application, said first user interface adapted to receive a debugging input from a user, said second user interface adapted to provide a current set of configuration parameters associated with said selected software application, said second user interface adapted to receive a configuration input from said user, and responsive to said configuration input, said second user interface adapted to change one or more configuration parameters from said current set of configuration parameters;
wherein at least one of said plurality of distinct user interfaces is adapted to cause an automatic generation of a high-speed control procedure, said high-speed control procedure adapted to be executed by said PLC; and
a software generator adapted to automatically generate a set of computer readable instructions for the PLC to control electrical inputs and outputs of the PLC responsive to information provided via at least one of said plurality of user interfaces.

19. A method comprising:
rendering a plurality of distinct user interfaces automatically from a programmable logic controller (PLC);
configuring a corresponding software application from a plurality of software applications associated with operating a programmable logic controller (PLC) via each user interface from said plurality of distinct user interfaces;
selecting and providing automatically, for a selected software application from said plurality of software applications, via a user interface renderer, a first user interface if said PLC is executing a control program, wherein said control program is a set of machine instructions adapted to read inputs from one or more sensors and control one or more actuators, and a second user interface if said PLC is not executing said control program, wherein said first user interface is adapted to facilitate debugging said selected software application and receive a debugging input from a user, said second user interface adapted to provide a current set of configuration parameters associated with said selected software application, and receive a configuration input from said user, and responsive to said configuration input, said second user interface adapted to change one or more configuration parameters from said current set of configuration parameters;
causing at least one of said plurality of distinct user interfaces to automatically generate a high-speed control procedure, said high-speed control procedure adapted to be executed by said PLC;
providing a software generator; and
automatically generating a set of computer readable instructions for the PLC to control electrical inputs and outputs of the PLC with said software generator in response to information provided via at least one of said plurality of user interfaces.

20. A non-transitory machine-readable medium comprising machine instructions for activities comprising:
automatically causing a plurality of distinct user interfaces to be rendered, each user interface from said plurality of distinct user interfaces adapted to configure a corresponding software application from a plurality of software applications associated with operating a programmable logic controller (PLC), for a selected software application from said plurality of software applications, a user interface renderer adapted to automatically select and provide a first user interface if said PLC is executing a control program, wherein said control program is a set of machine instructions adapted to read inputs from one or more sensors and control one or more actuators, and a second user interface if said PLC is not executing said control program, said first user interface adapted to facilitate debugging said selected software application, said first user interface adapted to receive a debugging input from a user, said second user interface adapted to provide a current set of configuration parameters associated with said selected software application, said second user interface adapted to receive a configuration input from said user, and responsive to said configuration input, said second user interface adapted to change one or more configuration parameters from said current set of configuration parameters;
causing at least one of said plurality of distinct user interfaces to automatically generate a high-speed control procedure, said high-speed control procedure adapted to be executed by said PLC; and
automatically generating a set of computer readable instructions for the PLC to control electrical inputs and outputs of the PLC with a software generator in response to information provided via at least one of said plurality of user interfaces.

* * * * *